(12) United States Patent
Kikuchi et al.

(10) Patent No.: US 7,653,311 B2
(45) Date of Patent: Jan. 26, 2010

(54) OPTICAL WAVELENGTH ADD-DROP MULTIPLEXER

(75) Inventors: Nobuhiko Kikuchi, Tokyo (JP); Kenro Sekine, Fuchu (JP); Shinya Sasaki, Koganei (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 699 days.

(21) Appl. No.: 10/913,432

(22) Filed: Aug. 9, 2004

(65) Prior Publication Data

US 2005/0226621 A1     Oct. 13, 2005

(30) Foreign Application Priority Data

Mar. 30, 2004     (JP)     ............... 2004-098258

(51) Int. Cl.
*H04J 14/02*     (2006.01)

(52) U.S. Cl. ............... 398/83; 398/79; 398/17; 398/59; 385/24; 385/37

(58) Field of Classification Search ............... 398/82, 398/83, 79, 84, 85, 45, 48, 50, 56, 33, 94, 398/25, 38, 93, 177, 87, 59, 10, 16, 17; 388/24, 388/37, 16, 17, 18
See application file for complete search history.

(56) References Cited

U.S. PATENT DOCUMENTS

| | | | | |
|---|---|---|---|---|
| 4,942,568 | A * | 7/1990 | Khoe et al. | 398/95 |
| 5,189,485 | A * | 2/1993 | Hackel et al. | 356/320 |
| 5,867,289 | A * | 2/1999 | Gerstel et al. | 398/12 |
| 6,490,042 | B1 | 12/2002 | Unno et al. | |
| 6,594,046 | B1 * | 7/2003 | Nishino | 359/239 |
| 6,885,820 | B2 * | 4/2005 | Eder et al. | 398/26 |
| 6,944,401 | B2 * | 9/2005 | Olier et al. | 398/94 |
| 7,006,765 | B2 * | 2/2006 | Hendow | 398/34 |
| 7,024,116 | B2 * | 4/2006 | Orbach et al. | 398/83 |

(Continued)

FOREIGN PATENT DOCUMENTS

CN     1183683 A     6/1997

(Continued)

OTHER PUBLICATIONS

"R-OADM Architecture: Now You Can Control The Light", Architectural White Paper, (Tropic Networks, Inc., 2003), pp. 1-11.

(Continued)

*Primary Examiner*—Hahn Phan
(74) *Attorney, Agent, or Firm*—Stites & Harbison, PLLC; Juan Carlos A. Marquez, Esq.

(57) ABSTRACT

Part of an inputted optical add signal 118 is reflected by a mirror 117, and is thereby inputted into an optical wavelength multiplexer 105 in the reverse direction so that the optical add signal is returned to paths 115-1 through 115-16 corresponding to wavelengths λ1 through λ16. If the returned optical add signal is an optical add signal having a correct wavelength, the optical signal enters its corresponding backward direction optical detector 113-16. Accordingly, it is possible to check whether or not a wavelength of the optical add signal is correct.

8 Claims, 22 Drawing Sheets

U.S. PATENT DOCUMENTS

2003/0035171 A1 2/2003 Touma
2003/0223747 A1 12/2003 Olier et al.

FOREIGN PATENT DOCUMENTS

| EP | 1 073 227 A2 | 7/2000 |
|---|---|---|
| JP | 11-218790 | 2/1998 |
| JP | 2001-044970 | 7/1999 |
| JP | 2003-124888 | 10/2001 |
| WO | WO01/80466 | 10/2001 |

OTHER PUBLICATIONS

Chinese Office Action mailed on May 9, 2008 regarding Chinese Application No. 200410071602.2, in Chinese.

Final Office Action from the Japanese Patent Office regarding Japanese Patent Application No. 2004-098258, dated Jun. 2, 2009, in Japanese.

* cited by examiner

PRIOR ART

PRIOR ART

PRIOR ART

FIG.5

(CASE 1) 2 × 2 SW(107-16) IS IN ADD-STATE.

| | | BACKWARD DIRECTION OPTICAL DETECTOR 113-16 | |
|---|---|---|---|
| | | SIGNAL DETECTED (1) | SIGNAL NOT DETECTED (0) |
| FOREWARD DIRECTION OPTICAL DETECTOR 111-16 | SIGNAL DETECTED (1) | ADD-SIGNAL EXISTS. (WAVELENGTH OK) | ADD-SIGNAL EXISTS. (WAVELENGTH ERROR) |
| | SIGNAL NOT DETECTED (0) | DETECTOR FAILURE | NO SIGNAL |

(CASE 2) 2 × 2 SW(107-16) IS IN THROUGH-STATE.

| | | BACKWARD DIRECTION OPTICAL DETECTOR 113-16 | |
|---|---|---|---|
| | | SIGNAL DETECTED (1) | SIGNAL NOT DETECTED (0) |
| FOREWARD DIRECTION OPTICAL DETECTOR 111-16 | SIGNAL DETECTED (1) | THROUGH-SIGNAL EXISTS. | DETECTOR FAILURE |
| | SIGNAL NOT DETECTED (0) | DETECTOR FAILURE | NO SIGNAL |

FIG.19
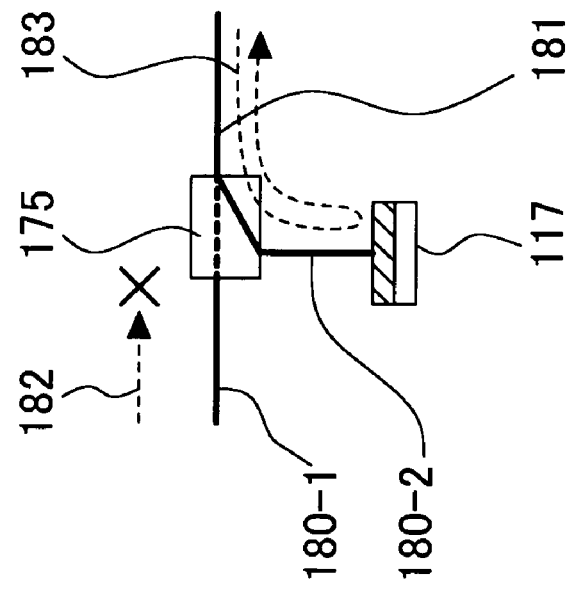
(b) ADD STATE
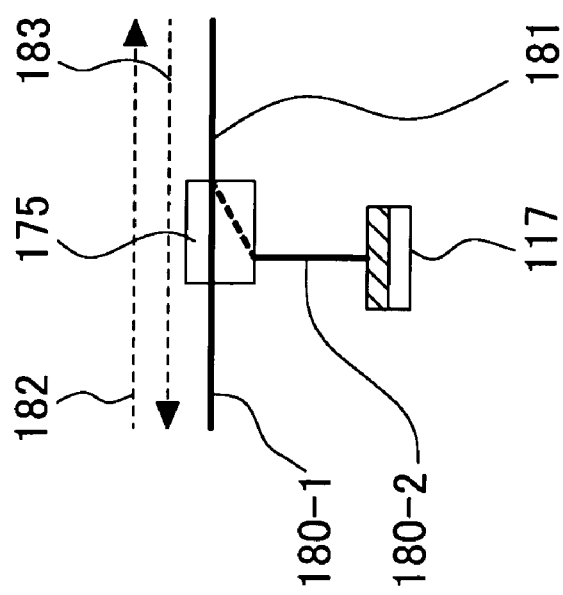
(a) THROUGH STATE

OPTICAL WAVELENGTH ADD-DROP MULTIPLEXER

CLAIM OF PRIORITY

The present application claims priority from Japanese application JP 2004-098258 filed on Mar. 30, 2004, the content of which is hereby incorporated by reference into this application.

BACKGROUND OF THE INVENTION

1. Field of the Invention

The present invention relates to optical information transmission that uses an optical fiber, and more particularly to an optical wavelength add-drop multiplexer.

2. Description of the Related Art

The wavelength division multiplexed (WDM) optical transmission method is a very effective method for increasing the capacity of optical fiber communication. In this method, a plurality of optical signals, each of which has a wavelength different from the other, are multiplexed in one optical fiber to transmit information. The optical wavelength add-drop multiplexer is one of transmission equipments placed for respective nodes in optical fiber networks which carry WDM signals. The optical wavelength add-drop multiplexer uses a technology whereby from among WDM signals that are transmitted through an optical fiber, only an optical signal having a necessary wavelength is branched (dropped) to receive the signal, and an optical signal transmitted from this node is inserted (added) into the WDM signals. In the optical wavelength add-drop multiplexer, most WDM signals transmitted through an optical fiber can be transmitted "through" as light without conversion into electric signals. The optical wavelength add-drop multiplexer, therefore, has an advantage of being able to reduce, to a large extent, the number of optical transceivers required for each node. Above all, when the reconfigurable optical wavelength add-drop multiplexer (ROADM) uses an optical switch, or the like, it can change, if necessary, a wavelength that is added/dropped at each node. The reconfigurable optical wavelength add-drop multiplexer attracts a great deal of attention because wavelength paths can be set by flexibly changing a configuration of transmission equipment according to the future growth of a network.

FIG. 2 is a diagram illustrating a configuration of a typical conventional reconfigurable optical wavelength add-drop multiplexer 120. A WDM signal, which has been transmitted from a WDM optical transmission device such as another reconfigurable optical wavelength add-drop multiplexer, is inputted from an input optical fiber 101, and is then amplified by an optical amplifier 102-1. The amplified signal is then inputted into the reconfigurable optical wavelength add-drop multiplexer 120. This is an example in which an optical signal having 16 wavelengths is wavelength division multiplexed. A WDM signal is separated by a optical wavelength demultiplexer 104 into different paths on a wavelength basis. The separated signals are output to output fibers 106-1 through 106-16 of a optical wavelength demultiplexer. After that, for example, an optical signal having a wavelength $\lambda 1$ passes through a 2×2 optical switch 107-1, and is then inputted into a variable optical attenuator 110-1. On the output side of the variable optical attenuator 110-1, an optical signal is branched by the optical coupler 112-1, and part of the optical signal is thereby inputted into the forward direction optical detector 111-1. Usually, an insertion loss of the variable optical attenuator 110-1 is automatically adjusted so that the optical power detected by the forward direction optical detector 111-1 is kept constant, variations in optical power among optical signals each having a specific wavelength are reduced. After that, the optical signal having the wavelength $\lambda 1$ is inputted into the optical wavelength multiplexer 105 through the input fiber 115-1, and is wavelength division multiplexed with optical signals having the other wavelengths $\lambda 2$ through $\lambda 16$ again. Then, the multiplex optical signal is amplified up to a specified output level by the optical amplifier 102-2 before the signal is transmitted to other optical transmission equipment from the output optical fiber 103. Usually, an AWG (arrayed waveguide grating) element, an element in which a tandem connection between dielectric multi-layer coating and an optical fiber grating is made, and the like, are used as the optical wavelength demultiplexer 104 and the optical wavelength multiplexer 105.

The 2×2 optical switch 107 is a switch used to switch between an add-drop state and a through state. For example, if the 2×2 optical switch 107-16 is in the through state, an optical signal having the wavelength $\lambda 16$ output from the output fiber 106-16 of the optical wavelength demultiplexer passes through the 2×2 optical switch 107-16 just as it is, and is then inputted into the optical wavelength multiplexer 105. On the other hand, if this switch is switched to an add-drop state, an optical signal having the wavelength $\lambda 16$ output from the output fiber 106-16 of the optical wavelength demultiplexer is output from a drop optical output fiber 109-16. Accordingly, it becomes possible to receive this optical signal by an optical receiver 124 placed in this network node. Incidentally, an optical signal having the wavelength $\lambda 16$ inputted from the optical add signal input fiber 108-16 is sent to a variable optical attenuator 110-16. As a result, an optical signal, which is transmitted from an optical transmitter 123 placed at this network node, can be added to a wavelength division multiplexing signal that is output from the output optical fiber 103.

Typical configurations of the reconfigurable optical wavelength add-drop multiplexer include not only the above-mentioned configuration, but also the broadcast and select type reconfigurable optical wavelength add-drop multiplexer as described in "R-OADM Architecture: Now You Can Control The Light", Architectural White Paper, Tropic Network Inc., May 3, <URL: http://www.tropicnetworks.com/library/pdf/ROADM_White_Paper__May__03.pdf>, and the like. FIG. 3 is a diagram illustrating a configuration example of the conventional broadcast and select type reconfigurable wavelength add-drop multiplexer 130. Inside this reconfigurable optical wavelength add-drop multiplexer 130, part of a WDM signal inputted from the input optical fiber 101 is first branched by the optical coupler 116-1, and then the branched signal is further branched by the optical coupler 133-1 into a plurality of drop optical output fibers 131. In this example, the number of drop output fibers is 4. A WDM signal, the power of which is attenuated, is output as it is from each of these drop output fibers. When it is intended to receive part of a WDM signal at this network node, a wavelength-selective optical receiver 125 having a function of selecting an optical signal wavelength to be received is connected to each fiber. By use of the wavelength-selective optical receiver 125, an optical signal having a desired wavelength is selected so that this specific optical signal is received.

On the other hand, another optical signal, which has been branched by the optical coupler 116-1, is inputted into a gain equalizer 134. The gain equalizer 134 is an element having a function of eliminating an optical signal having an unnecessary wavelength by sufficiently attenuating this optical signal so that only optical signals having necessary wavelengths are passed through as through signals. For example, the gain equalizer 134 can be configured as shown in FIG. 4. In FIG. 4, a wavelength division multiplexed signal inputted from the input optical fiber 101 is branched by an optical wavelength demultiplexer 104 into different paths corresponding to the maximum number of wavelengths (in this example, 16). For example, an optical signal having the wavelength λ1 is inputted into the variable optical attenuator 110-1. Then, part of the optical signal is branched by the optical coupler 114-1 so that the branched optical signal is inputted into the forward direction optical detector 111-1. The power of an optical through signal can be kept constant when an insertion loss of the variable optical attenuator 110-1 is automatically adjusted so that the optical power detected by the forward direction optical detector 111-1 is kept constant. In addition, making a loss of the optical attenuator sufficiently large makes it possible to eliminate only optical signals having unnecessary wavelengths. After that, the optical wavelength multiplexer 105 multiplexes only through signals having necessary wavelengths, before outputting the multiplexed signal to the output optical fiber 103.

In the configuration shown in FIG. 3, optical add signals, which have been inputted into four optical add signal input fibers 132-1 through 132-4, are combined by the optical coupler 133-2 into one signal. After that, this signal is introduced into the optical coupler 116-2, where the signal is further combined with optical through signals output from the gain equalizer 134, and is then output to the output optical fiber 103.

Such a broadcast and select type reconfigurable optical wavelength add-drop multiplexer is characterized by the drop optical output fibers 131-1 through 131-4 and the optical add signal input fiber 132-1 through 132-4, each of which is branched or coupled by use of an optical coupler that is not wavelength dependent. Therefore, the broadcast and select type reconfigurable optical wavelength add-drop multiplexer has advantages that the optical drop signal output fibers and the optical add signal input fibers are all independent of the difference in wavelength and the assignment of a wavelength, and that it is not necessary to consider a wavelength of an optical transceiver to be connected.

The conventional optical wavelength add-drop multiplexer as described above, however, is not sufficiently provided with a mechanism for detecting a misconnection caused by a user, which is a large problem. In particular, a problem which has not been conventionally pointed out is that a wavelength error of an optical add signal cannot be detected.

For example, it is necessary to properly connect optical transmitters, which output wavelengths λ1 through λ16, to the optical add signal input fibers 108-1 through 108-16 of the conventional reconfigurable optical wavelength add-drop multiplexer 120 shown in FIG. 2 respectively. In a building or an equipment room, in which these optical transmission devices are placed, a worker connects between different devices by use of optical fiber patch cables, or the like. Therefore, there is a possibility that the worker will connect the optical transmitter 123 handling an invalid wavelength to the optical add signal input fiber 108, a wavelength of which differs from that of the optical transmitter 123, as a result of connecting an optical fiber by mistake.

A dotted line 121 in the figure indicates a path of an optical add signal having a correct wavelength (λ16). To add an optical signal having the wavelength λ16, if the optical signal is properly connected to the optical add signal input fiber 108-16, the optical signal pass through the optical wavelength multiplexer 105 as indicated by the dotted line. Then, its output light is multiplexed into a WDM signal before the WDM signal is introduced into the output optical fiber 103.

To the contrary, if the optical transmitter 123 handling the wavelength λ3 which is improper is connected to the optical add signal input fiber 108-16, an optical signal travels along a path 122 drawn with a dash-dotted line. In this case, although the optical signal arrives at an input fiber 115-16 of the optical wavelength multiplexer 105, the optical signal cannot pass through the wavelength multiplexer 105. Thus, the optical signal is blocked here. Because the forward direction optical detector 111-16 is provided in the middle of the optical signal path, it is possible to make a judgment at this point as to whether or not an optical signal exists. However, both in the case of a correct wavelength (path 121) and in the case of an incorrect wavelength (path 122), it is judged that an optical signal exists. Accordingly, an erroneously connected wavelength cannot be detected.

Accordingly, firstly, it is not possible to detect the occurrence of a misconnection in a work site. Even if a communication line stops due to a trouble, it is difficult to solve the trouble, and therefore problems of time and cost arise.

Secondly, the conventional reconfigurable optical wavelength add-drop multiplexer 120 has a problem that because an optical add signal is judged to have been internally added, power settings of the optical signal, or the like, are improperly made, causing the signal degradation. Usually, the reconfigurable optical wavelength add-drop multiplexer manages the number of wavelengths of a transmitted optical signal. Further, the output power of the optical amplifiers 102-1 and 102-2 is increased or decreased in response to the increase, or the decrease, in the number of wavelengths so that the optical power of the other wavelengths being used is not influenced by the change of state such as add and/or drop of a signal light having a certain wavelength. This is how to prevent the signal light power from varying. If as a result of the wavelength error as described above, even the optical signal which is not actually output from the reconfigurable optical wavelength add-drop multiplexer 120 results in a misjudgment in the device that an optical signal has been detected, the discrepancy is produced between the number of wavelengths actually transmitted and the number of wavelengths managed in the device. As a result, the optical output power is improperly set in the optical amplifiers 102-1 and 102-2. Thus, if the optical signal power varies from a proper set value, there is a possibility that the following large problems will arise: a signal-to-noise ratio of a signal light is not sufficient; a nonlinear optical effect is caused by the excess optical power, resulting in the degradation; the optical power inputted into an optical receiver exceeds an allowable range, resulting in incapability of receiving, or a breakdown of a receiver; and the like.

The broadcast and select type reconfigurable optical wavelength add-drop multiplexer shown in FIG. 3 also has the first and second problems described above. However, the broadcast and select type reconfigurable optical wavelength add-drop multiplexer further has a third problem. To be more specific, if an operator connects by mistake an optical transmitter, which handles the same wavelength as that of an optical through signal being transmitted or that of another optical add signal, to an optical add signal input fiber, an optical signal being used for information transmission cannot be transmitted, causing a serious failure. For example, as indicated by a path 136 drawn with a dotted line, an optical signal having the wavelength λ2 is inputted from the input optical fiber 101, and passes through the gain equalizer 134 as an optical through signal, and is then output to the output optical fiber 103. In this case, if the optical transmitter 123 for handling the wavelength λ2 is connected to an optical add signal input fiber so as to transmit an optical signal, an optical add signal travels along a path 137 drawn with a dotted line.

As a result, both optical signals interfere with each other at an output point of the optical coupler 116-2. Because these optical signals are modulated with information signals that differ from each other, there is a possibility that one, or both, cannot be received. However, the broadcast and select type type reconfigurable optical wavelength add-drop multiplexer does not have a mechanism for detecting a wavelength error of such an optical add signal, and an interlock mechanism for avoiding a failure caused by a wavelength error before it happens, which is the problem. In general, with the object of judging whether or not an optical add signal exists, the optical couplers 112-1 through 112-4 are placed at the input optical fibers 132-1 through 132-4 so that the optical add signal is detected by the optical detectors 135-1 through 135-4 respectively. However, by use of this configuration, it is not possible to make a judgment as to whether or not a wavelength of the optical add signal is correct.

SUMMARY OF THE INVENTION

An object of the present invention is to solve the following problems of the optical wavelength add-drop multiplexer which are newly pointed out in present invention: a wavelength error of an optical add signal cannot be detected; and a wavelength error of an optical add signal causes a failure.

As for the problem, which is newly pointed out in the present invention, that a wavelength error of an optical add signal cannot be detected, this problem can be solved by providing the function of: measuring a wavelength of an optical add signal; judging whether or not a wavelength of an optical add signal is correct; only when an optical add signal having a correct wavelength is detected, judging that an optical add signal exists; or only when an optical add signal having a correct wavelength is detected, calculating the number of optical add signals. In particular, by displaying a measured value of a wavelength of the inputted optical add signal, information which can be used to judge whether or not a wavelength is correct, information about the number of wavelengths of an optical add signal having a correct wavelength, or an alarm based on the judgment as to whether or not a wavelength is correct, on a display unit such as a lamp, a LED, a liquid crystal, or a display screen, or by notifying a remote operator or other equipment of the above-mentioned information, it is possible to correctly notify an operator, a network administrator, or other transmission equipment, of a state of a wavelength error, and thereby to solve the wavelength error of the optical add signal more effectively.

In addition, it becomes possible to avoid a failure caused by a wavelength error before it happens by the following: if a wavelength of an optical add signal to be newly added is judged to be incorrect, or if the wavelength of the optical add signal to be newly added is equivalent to that of an optical through signal being transmitted or that of another optical add signal being transmitted, blocking the optical add signal; or after checking that the wavelength of the optical add signal to be newly added is correct, adding the optical add signal to a wavelength division multiplexing transmission line; or multiplexing only an optical add signal having a correct wavelength with optical through signals.

The above-mentioned function can be easily realized in particular by using, in the optical wavelength add-drop multiplexer, an optical wavelength demultiplexer for demultiplexing an inputted wavelength division multiplexed optical signal on a wavelength basis, or an optical wavelength multiplexer for multiplexing into a wavelength division multiplexed signal that is output, not only for multiplexing or demultiplexing purposes, but for the wavelength measurement of an optical add signal or for the judgment as to whether or not a wavelength of an optical add signal is correct.

The use for both purposes as described above can be achieved by passing, in the reverse direction, part of a wavelength division multiplexing signal that is output from an optical wavelength add-drop multiplexer to an optical fiber transmission line, and by inputting the passed signal, in the reverse direction, into an optical wavelength multiplexer, which is used to wavelength multiplex a wavelength division multiplexed optical signal in an optical wavelength add-drop multiplexer, to separate the inputted signal into different paths on a wavelength basis, and then by detecting the existence of signal light having each corresponding wavelength by use of the backward direction optical detector placed in each path. Further, the above-mentioned use can also be achieved by using an optical wavelength multiplexer having a circular type wavelength multiplexing property as an optical wavelength multiplexer for multiplexing wavelength division multiplexed output light of the optical wavelength add-drop multiplexer, and by placing an optical detector on unused output ports other than an output port that output a wavelength division multiplexed optical signal, and then by judging, from the output signals, whether or not a wavelength of an optical add signal is correct.

In addition, as for the problem that a wavelength error of an optical add signal causes a failure, it is possible to solve this problem by placing, on the input side of the optical add signal, an optical filter that passes only an optical signal having a correct wavelength, or by placing, at a position before an optical detector for detecting the existence of an optical add signal, an optical filter that passes only an optical signal having a correct wavelength. To be more specific, it is possible to prevent a count error of the number of wavelengths from occurring in the device by providing a function by which only when optical add signals having correct wavelengths are inputted, it is judged that optical add signals exist.

In particular, if a broadcast and select type optical wavelength add-drop multiplexer is used, and if there are path for wavelength-demultiplexed optical through signals inside the broadcast and select type optical wavelength add-drop multiplexer, it is possible to solve the problem by: inputting all optical add signals combined by optical couplers, in the reverse direction, from the output side toward the input side of the optical wavelength add-drop multiplexer; inputting the optical add signals from the reverse direction into an optical wavelength multiplexer for multiplexing optical through signals on a wavelength basis so that the inputted signals are separated into different paths on a wavelength basis; and selecting either totally reflecting an optical add signal traveling in the reverse direction for each wavelength path to output the optical add signal in the forward direction, or transmitting an optical through signal in the forward direction to output this optical through signal. The problem can also be solved by: temporarily combining all optical add signals by an optical coupler, before demultiplexing the combined signal into different paths on a wavelength basis by an optical wavelength demultiplexer; between a path of the demultiplexed optical through signal and a path of the demultiplexed optical add signal, selecting one of paths each having the same wavelength, and inputting into an optical wavelength multiplexer; and selecting either transmitting an optical through signal to output this optical through signal, or selecting an optical add signal to output this optical add signal.

According to the present invention, firstly, it becomes possible to detect a wavelength of an optical add signal, and to judge whether or not the wavelength is correct, both of which were not conventionally pointed out. Displaying, for an operator of the equipment, the result of the judgment as to whether or not the wavelength is correct, or transferring the result to other equipment through a network, makes it possible to easily detect a wavelength error of an optical add signal, which could not be conventionally detected. As a result, a period of time and the cost, which are required to solve the trouble, are reduced, making it possible to quickly recover a communication line.

Next, it is possible to prevent a count error of the number of wavelengths from occurring in the device by: detecting a wavelength error of an optical add signal; or providing a function whereby only when an optical add signal having a correct wavelength is inputted, it is judged that an optical add signal exists; or providing a function whereby only when an optical add signal having a correct wavelength is inputted, counting the number of wavelengths. As a result, it becomes possible to avoid the problems including: the degradation by a nonlinear optical effect caused by an insufficient signal-to-noise ratio of signal light, or caused by an excess of the optical power, resulting from improper settings of the optical output power of the optical amplifier, or the like; and a communication failure, caused by falling outside the allowable range of the optical power inputted into the optical receiver, or a breakdown of a receiver.

Moreover, according to the present invention, the broadcast and select type reconfigurable optical wavelength add-drop multiplexer can also be provided with a detection mechanism for detecting a wavelength error of an optical add signal, and an interlock mechanism for avoiding a failure caused by a wavelength error before it happens.

BRIEF DESCRIPTION OF THE DRAWINGS

FIG. 5 is a diagram illustrating the wavelength error judgment algorithm according to the first embodiment of the present invention;

FIG. 19 is a diagram illustrating operation of a 2×1 optical switch 175 according to the eleventh embodiment of the present invention;

DESCRIPTION OF THE PREFERRED EMBODIMENTS

Figure 2:
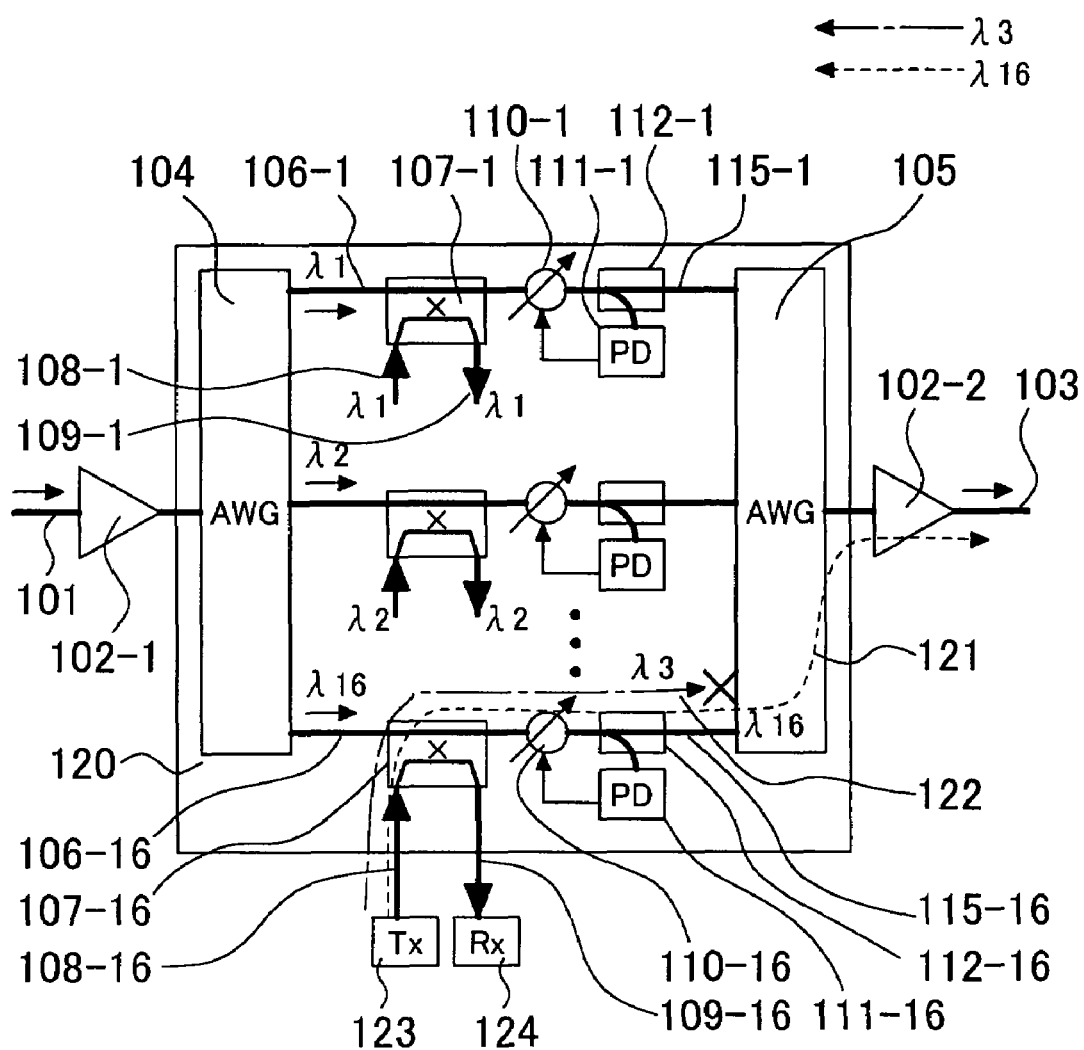
FIG. 2 is a configuration diagram illustrating the conventional reconfigurable optical wavelength add-drop multiplexer.

In best modes for carrying out the present invention, the conventional reconfigurable optical wavelength add-drop multiplexer shown in FIG. 2 is provided with a mechanism for detecting wavelengths of optical add signals, or for judging whether or not the wavelength of the optical add signal are correct; or the conventional reconfigurable optical wavelength add-drop multiplexer is provided with a function by which only when optical add signals having correct wavelengths are inputted, it is judged that optical add signals exist. As described in the undermentioned embodiments, these modes can be achieved, for example, by providing the reconfigurable optical wavelength add-drop multiplexer with a wavelength meter for detecting a wavelength of an optical add signal, or by placing an optical filter, through which only an optical signal having a correct wavelength passes, at a position where an optical add signal is inputted, or by placing an optical filter, through which only an optical signal having a correct wavelength passes, at a position before an optical detector for detecting the existence of an optical add signal.

Figure 3:
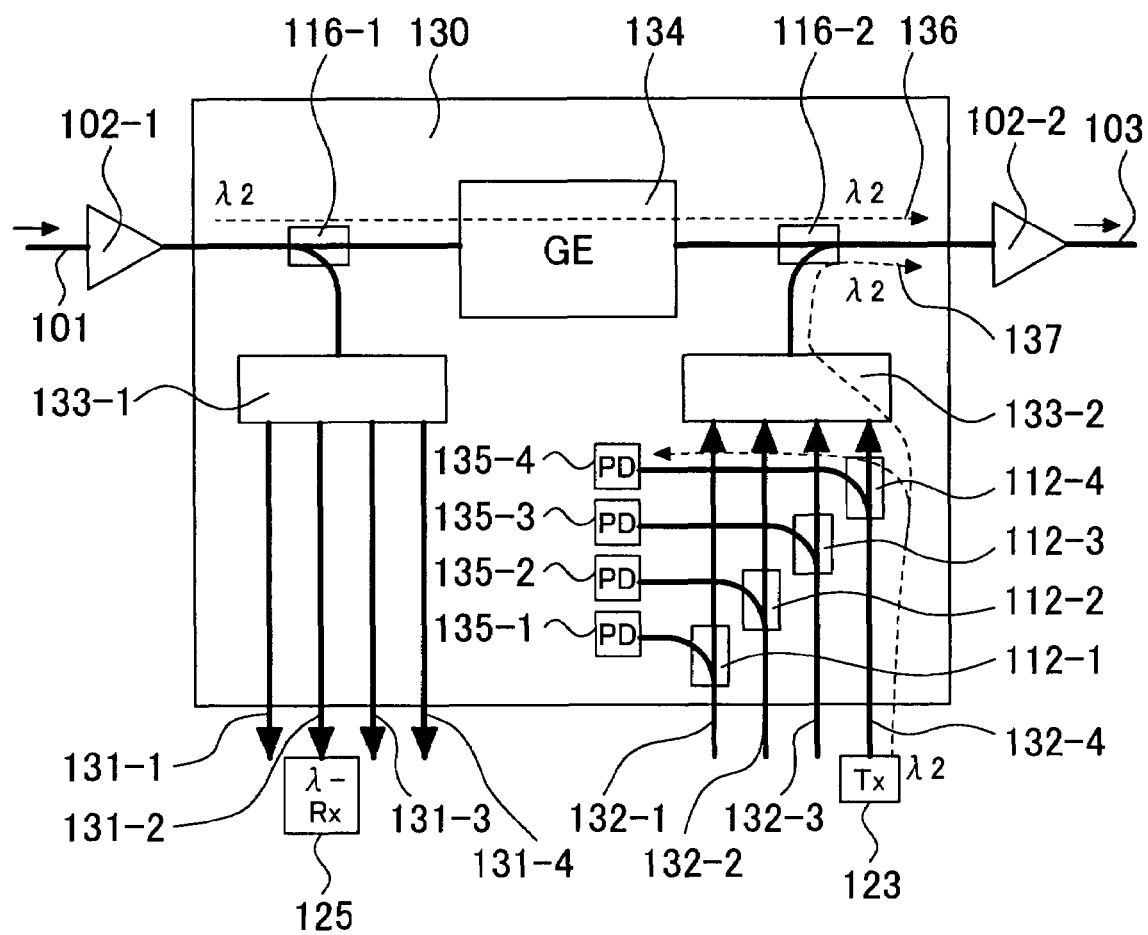
FIG. 3 is a configuration diagram illustrating the conventional broadcast and select type reconfigurable optical wavelength add-drop multiplexer.
Figure 4:
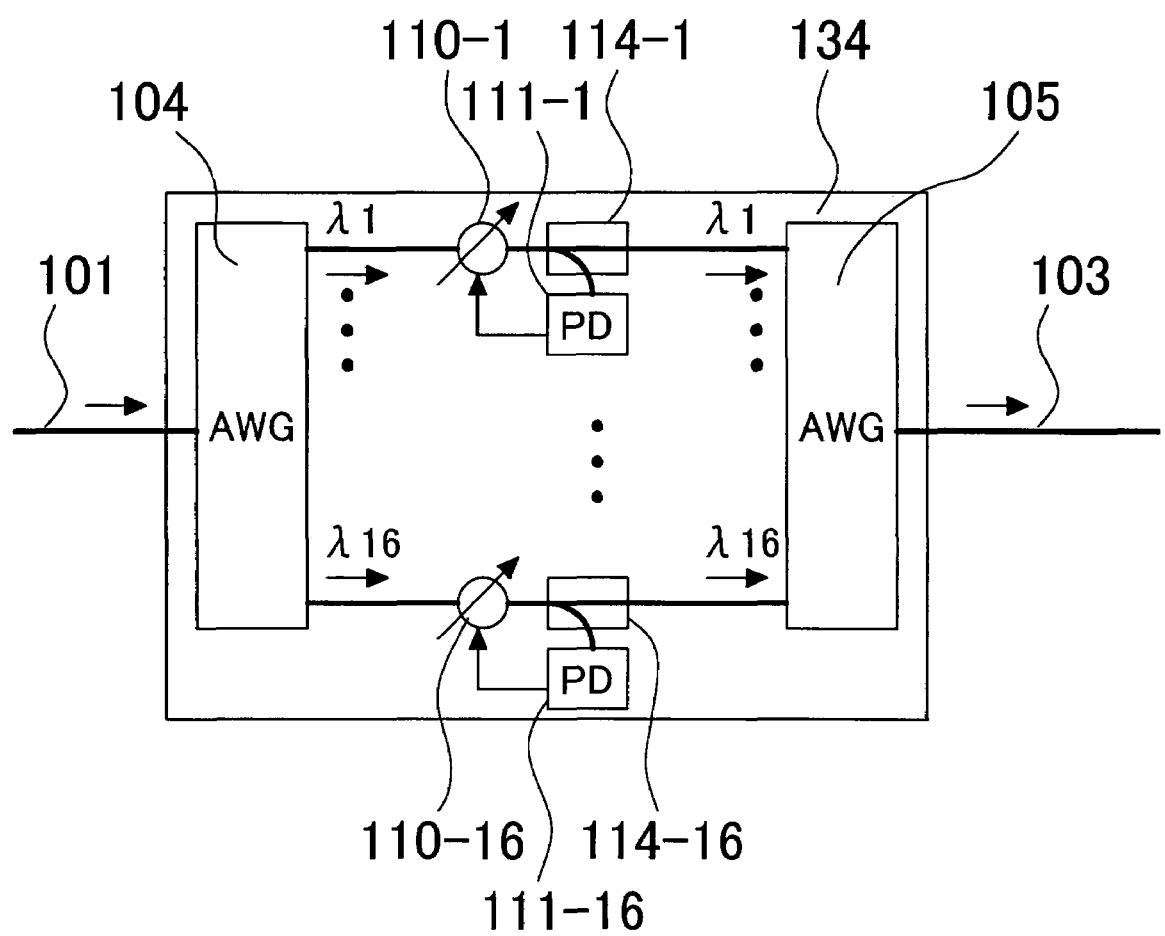
FIG. 4 is a configuration diagram illustrating an example of the conventional gain equalizer.

In addition, in the case of the conventional reconfigurable optical wavelength add-drop multiplexer shown in FIG. 3, which is the broadcast and select type, the best mode is a configuration in which an optical filter, an optical wavelength demultiplexer, or the like, is placed in a path of an optical add signal so that in particular only optical add signals having correct wavelengths are multiplexed into an optical through signal before the optical through signal is output.

First Embodiment

Figure 1:
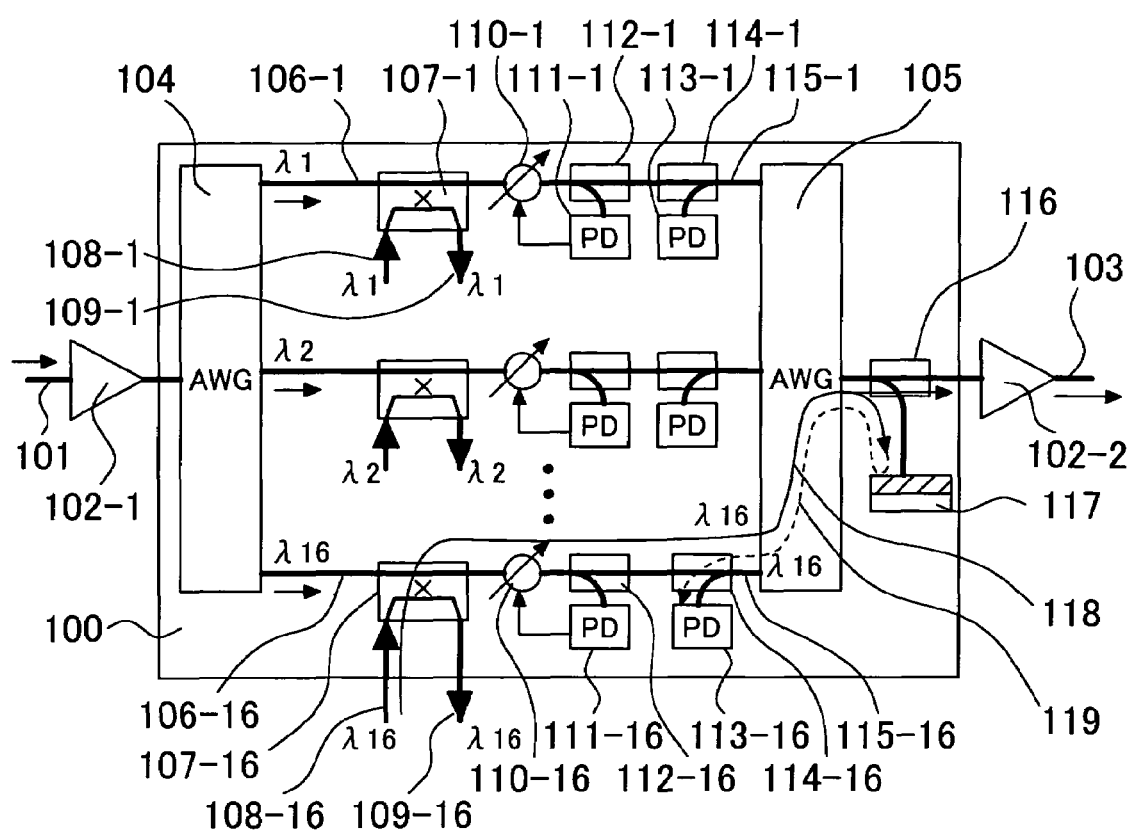
FIG. 1 is a configuration diagram illustrating a first embodiment of the present invention.

FIG. 1 is a configuration diagram illustrating a first embodiment of the present invention. FIG. 1 illustrates a configuration example of a reconfigurable optical wavelength add-drop multiplexer (ROADM) 100 to which the present invention is applied. This configuration is made by adding optical couplers 114-1 through 114-16, backward direction optical detectors 113-1 through 113-16, an optical coupler 116, and a mirror 117 to the conventional configuration shown in FIG. 2. The optical coupler 116 branches part of a wavelength division multiplexed optical signal output from the reconfigurable optical wavelength add-drop multiplexer 100, and then introduces the branched optical signal (for example, about from 1 to 20%) into the mirror 117. As a result, the part of the wavelength division multiplexed light is reflected and then passes through the optical coupler 116 again, and consequently enters a optical wavelength multiplexer 105 in the reverse direction. The wavelength division multiplexed light is separated by the optical wavelength multiplexer 105 on a wavelength basis. The separated light beams having wavelengths λ1 through λ16 pass through paths 115-1 through 115-16 respectively. After that, the light beams are separated again by the optical couplers 114-1 through 114-16, and then the backward direction optical detectors 113-1 through 113-16 detect the light beams respectively. Although forward direction optical detectors 111 also detect the existence of optical add signals having incorrect wavelengths, only optical add signals and optical through signals which are output to an optical fiber 103 enter the backward direction optical detectors 113-1 through 113-16 in this configuration. Accordingly, it becomes possible to judge whether or not a wavelength error of an optical add signals have occurred. For example, when an optical signal having the correct wavelength λ16 enters an optical add signal input fiber 108-16 used for an optical signal having the wavelength λ16, as indicated by a path 118 of the optical add signal having the wavelength λ16, this signal is multiplexed into a wavelength division multiplexed signal by the optical wavelength multiplexer 105, and is then output from the output optical fiber 103. At the same time, part of the wavelength division multiplexed signal is reflected back by the mirror 117, and travels in the reverse direction, and consequently returns to the same path 115-16 again as indicated by a path 119 used after the reflection of the optical signal having the wavelength λ16. The signal returned to the path 115-16 is branched by the optical coupler 114-16, and is then inputted into the backward direction optical detector 113-16. On the other hand, if an optical add signal having a wrong wavelength (for example, any one of the wavelengths λ1 through λ15) is inputted into the optical add signal input fiber 108-16, the optical add signal is blocked by the optical wavelength multiplexer 105 placed before the mirror. Accordingly, the optical signal is not inputted into the backward direction optical detector 113-16.

Incidentally, in this configuration, if an optical through signal having the wavelength λ16 exists, and if a 2×2 optical switch 107-16 is in a through state, an optical through signal reflected by the mirror 117 is inputted into the backward direction optical detector 113-16. Therefore, the judgment as to whether or not a wavelength error of an optical add signal has occurred requires processing as described below. FIG. 5 illustrates the judgment algorithm of how to judge the occurrence of a wavelength error of an optical add signal, relating to an optical signal having the wavelength λ16. The judgment algorithm is an object of the present invention. (1) shows the case where the 2×2 optical switch 107-16 is in the add state. To begin with, if the forward direction optical detector 111-16 has detected input light, it is judged that an optical add signal having some wavelength is inputted into the optical add signal input fiber 108. Further, at this time, if the backward direction optical detector 113-16 has detected input light, a wavelength of an optical signal can be judged to be correct (λ16) as described above; and if the backward direction optical detector 113-16 has not detected an input light, a wavelength can be judged to be incorrect (f or example, λ3). On the other hand, if the forward direction optical detector 111-16 has not detected an input light, it is judged that an optical add signal does not exist. Further, by checking whether or not the backward direction optical detector 113-16 has detected an input light, the device can be judged to be in a failure state or in a state of no signal. On the other hand, if the 2×2 optical switch 107-16 is in a through state, only an optical through signal passes through the optical switch and is then output. Accordingly, by checking whether or not the forward direction optical detector 111-16 has detected input light, and whether or not the backward direction optical detector 113-16 has detected input light, the detector can be judged as shown in FIG. 5 (2). Using the information, therefore, makes it possible to judge whether or not a wavelength of an optical add signal is correct, which is one object of the present invention.

Figure 6:
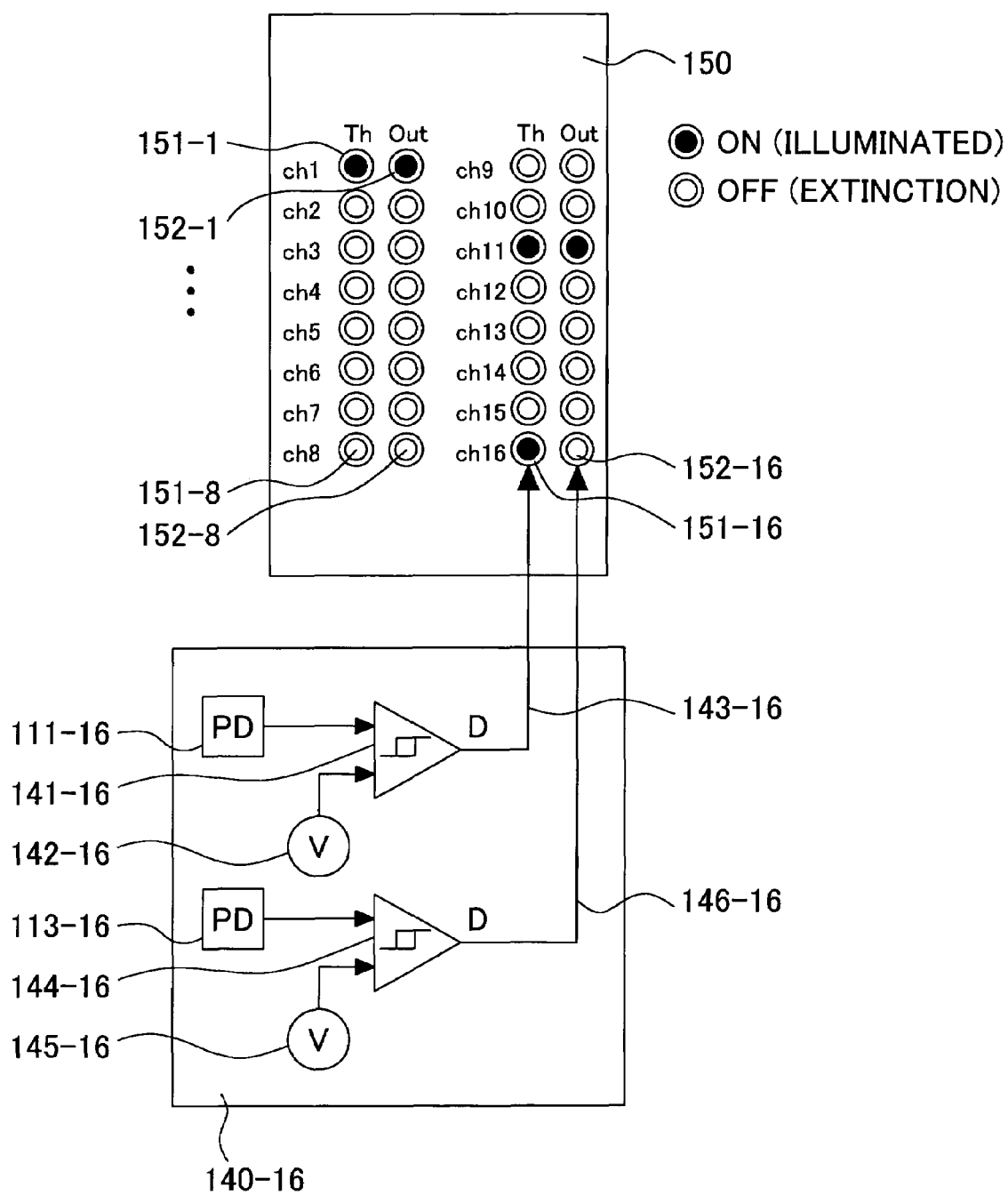
FIG. 6 is a configuration diagram illustrating a display panel according to the first embodiment of the present invention.

If the above-mentioned information which can be used to judge whether or not a wavelength is correct is displayed on part of a panel 150 of the reconfigurable optical wavelength add-drop multiplexer by use of a configuration shown in FIG. 6, an operator can quickly keep track of a wavelength connection error, and the like. A LED display circuit 140-16 is a circuit used for the display control of a forward direction display LED 151-16 and a backward direction display LED 152-16, which are two LEDs for indicating a state of the wavelength λ16. Optical power signals output from the forward direction optical detector 111-16 and the backward direction optical detector 113-16, which are used in FIG. 1, are inputted into voltage comparators 141-16, 144-16 as voltage signals respectively. Then, the voltage signals inputted into voltage comparators 141-16, 144-16 are compared with output voltage values of reference voltage sources 142-16, 145-16 respectively, and thereby judgments as to whether or not an optical signal has been detected are made with reference to these values. Signals obtained as a result of the judgments are amplified before the signals are converted into LED driving signals 143-16, 146-16. If it is judged that an optical signal has been detected, the LED 151-16 and/or the LED 152-16 are lighted up. The operator can make a judgment from the display result and the tables shown in FIG. 5 so that a wavelength error and a failure of the detector are detected. To be more specific, if both of the forward direction display LED (151-1 through 151-16) on the left side and the backward direction display LED (152-1 through 152-16) on the right side are off at the same time, it is judged that no input light has been detected (normal). If both of the forward direction display LED and the backward direction display LED are on at the same time, it is judged that input light has been detected (normal). If only one LED is on, it is judged that some abnormal condition has occurred. In particular, if connecting and lighting up an optical add signal causes only the left LED to illuminate whereas the right LED does not illuminate, it is possible to judge that a wavelength of the connected optical add signal is incorrect. Incidentally, what was described in this embodiment is the example in which an analog voltage signal is used to transmit information, and in which a judgment circuit is realized by hardware. However, other analog quantitative data, such as electric current, and a digitized signal, may also be used; or the whole judgment circuit may also be realized by software.

Figure 7:
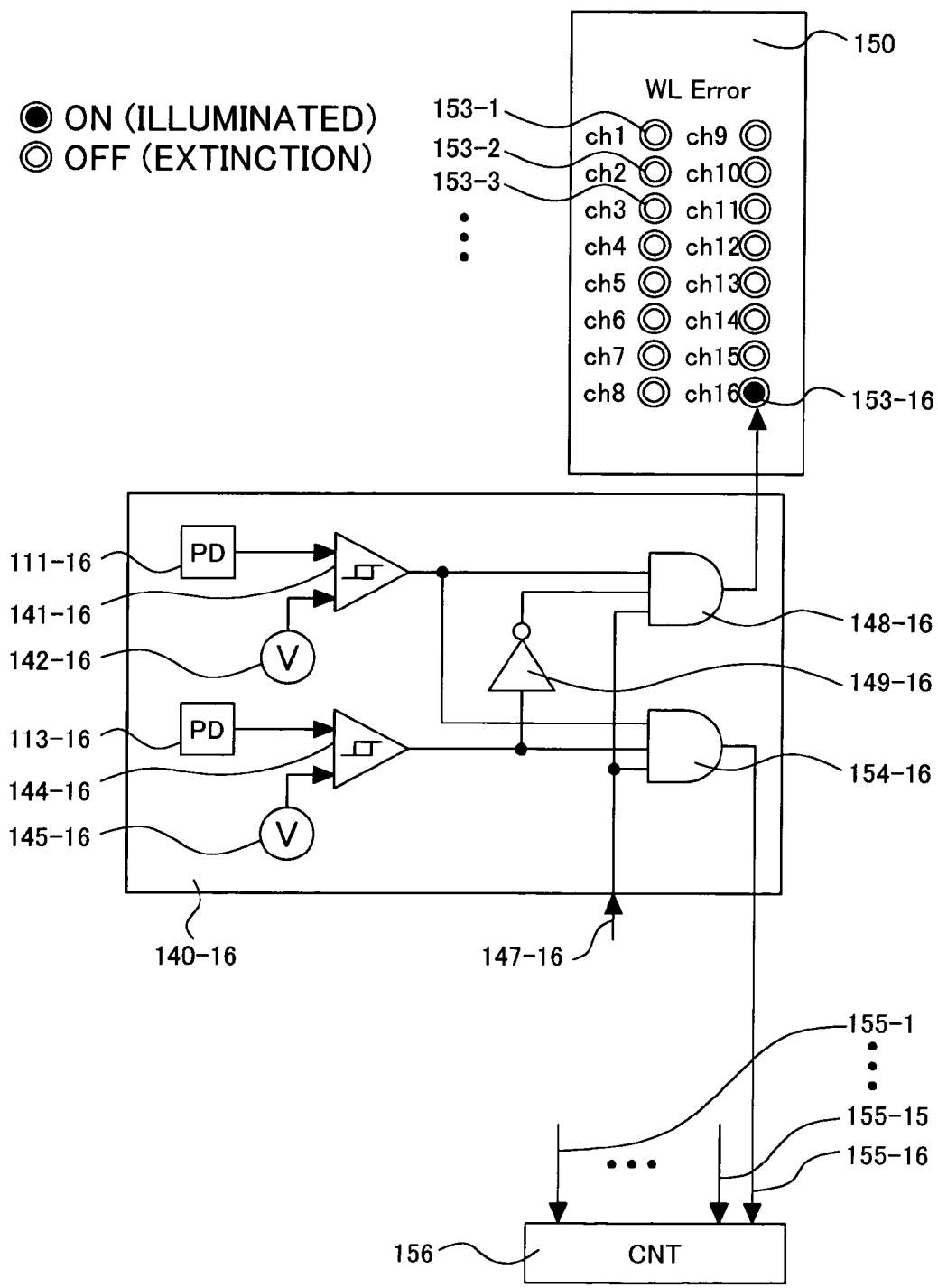
FIG. 7 is another configuration diagram illustrating a display panel according to the first embodiment of the present invention.

The configuration is not limited to that shown in FIG. 6. There are variations in how to implement the display panel. FIG. 7 is another configuration diagram illustrating the display panel 150 according to the first embodiment of the present invention. This is an example in which the display panel 150 is used to directly display the result of judging whether or not a wavelength error has occurred so that the operator is notified of the wavelength error, and to calculate the number of wavelengths of an optical add signal having a correct wavelength in the device. In this example, the result of the judgment by the voltage comparator 141-16 and 144-16 as to whether or not an optical signal has been detected is output as a digital signal (if an optical signal has been detected, 1 is output; and if no optical signal has been detected, 0 is output). In addition, a signal 147-16 is a digital signal indicating a state of the 2×2 optical switch 107-16. If the 2×2 optical switch 107-16 is in the add state, the signal 147-16 has a value of 1; and if the 2×2 optical switch 107-16 is in the through state, the signal 147-16 has a value of 0. A wavelength-error detection AND circuit 148-16 carries out logical product (AND) operation of three signals: an output signal of the voltage comparator 141-16; a signal to which an output of the voltage comparator 144-16 is inverted by the invert circuit 149-16; and the state signal 147-16. Judging from FIG. 5, a value of this signal becomes 1 only when an optical add signal has been detected, and the optical switch is in the add state, and a wavelength error has occurred. Therefore, this signal is amplified, and a wavelength error display LED 153-16 is switched on. This makes it possible to display the occurrence of a wavelength error of an optical add signal so that the operator can find the wavelength error more easily.

Incidentally, although the information about the wavelength error obtained as a result of the judgment as described above is output to the display panel, the information may also be output in the following ways: outputting the information as an alarm such as a voice or a buzzer; transmitting the information to other transmission equipment as an alarm, for example, by including the information in header information of an optical signal to be transmitted through a network; sending the information as error information to a remote operator and a management node; and the like. This makes it possible to know and solve a wavelength error more easily.

On the other hand, by calculating the number of wavelengths of optical add signals having correct wavelengths, it is possible to always keep the correct number of wavelengths corresponding to the number of wavelengths of optical signals that is actually transmitted. In FIG. 7, an optical add signal detection AND circuit 154-16 calculates a logical product of three signals: the output signals of the two voltage comparators 141-16, 144-16; and the state signal 147-16. As a result, an optical add signal detection signal 155-16 are generated. This logic signal becomes 1 only when an optical add signal having a correct wavelength is inputted. Accordingly, by counting by an optical add signal counter 156 the number of signals, each having a value of 1, from among the optical add signal detection signals 155-1 through 155-16 corresponding to each wavelength, it is possible to correctly keep track of the number of the optical add signals to be inserted into a wavelength division multiplexed signal in the reconfigurable optical wavelength add-drop multiplexer according to the present invention. Managing the number of wavelengths of a WDM signal on the basis of this information makes it possible to prevent the optical output power of the optical amplifier, or the like, from being set by mistake. As a result, it becomes possible to avoid the following problems: the degradation caused by insufficient signal-to-noise ratio of a signal light, and the degradation by a nonlinear optical effect caused by an excess of the optical power, resulting from the optical output power set by mistake; a communication failure, or a breakdown of an optical receiver, caused by falling outside the allowable range of the optical power inputted by the optical receiver; and the like.

It is to be noted that although the case where the number of wavelengths is 16 is shown in the first embodiment described above, the number of wavelengths is not particularly limited in the present invention, and that the wavelength channel separation which is not always constant may also be used. Moreover, the present invention can be applied not only to the Dense-WDM (DWDM) that is widely used for the trunk transmission systems, but also to the Coarse-WDM (CWDM), the wavelength channel separation of which is wide. Further, except the case where a circulating AWG is required, the wavelength channel separation of a WDM signal does not need to be constant.

In addition, as an optical wavelength multiplexer 105 or an optical wavelength demultiplexer 104, which is used to multiplex or demultiplex wavelengths, there is no particular limitation. In other words, any type of multiplexer/demultiplexer, including the arrayed waveguide (AWG) type, the dielectric filter type, the optical fiber grating type, and the like, can be used so long as it is a multiplexer/demultiplexer which is used to multiplex/demultiplex general wavelength division multiplexed signals. Additionally, if the optical wavelength multiplexer 105 is not used to judge the wavelength of an optical add signal in the embodiment, an optical coupler having no wavelength dependency may also be used as the optical wavelength multiplexer, or an optical coupler may also be combined with an optical wavelength multiplexer. In this example, a wavelength division multiplexed signal is multiplexed/demultiplexed by one multiplexer/demultiplexer. However, this configuration may also be divided into parts if necessary. Further, a wavelength band may also be divided into C-band and L-band, or may also be divided into narrower bands.

It is to be noted that although the optical amplifiers are placed at positions before and after the reconfigurable optical wavelength add-drop multiplexer 100 in this example, the optical amplifiers may also be arbitrarily placed if necessary at positions where much loss occurs.

In the configuration in which backward signal light is used, there is a possibility that unnecessary backward signal light which is reflected will interfere with signal light going in the forward direction, causing the signal degradation. However, as shown in this example, if an element (like the optical amplifier 102-1) having a built-in optical isolator in an output unit is placed on the upstream side of the optical wavelength add-drop multiplexer, it is possible to prevent the backward signal light from being reflected. The optical isolators, or the like, may also be placed at positions before and after the optical wavelength multiplexer 104 if necessary.

Moreover, although the above is the example of the reconfigurable optical wavelength add-drop multiplexer, the present invention can also be applied to a fixed optical wavelength add-drop multiplexer, an add-drop wavelength of which is completely or partially fixed, without problems. Further, also as for the broadcast and select type reconfigurable optical wavelength add-drop multiplexer, and also as for the wavelength tunable optical wavelength add-drop multiplexer in which an optical add signal input fiber unit is provided with a matrix switch, and the like, and in which a wavelength tunable source is used for an optical add signal source so as to make an optical add signal wavelength tunable, the present invention is effective because a wavelength error of an optical add signal may occur due to an operator's mistake, a circuit failure, a communication error at the time of wavelength settings or at the time of switching a switch, or the like.

Incidentally, because the optical detector (PD) and the reflection mirror which are used in this embodiment are relatively inexpensive elements, the total cost of the optical add-drop multiplexer is kept low.

Second Embodiment

Figure 8:
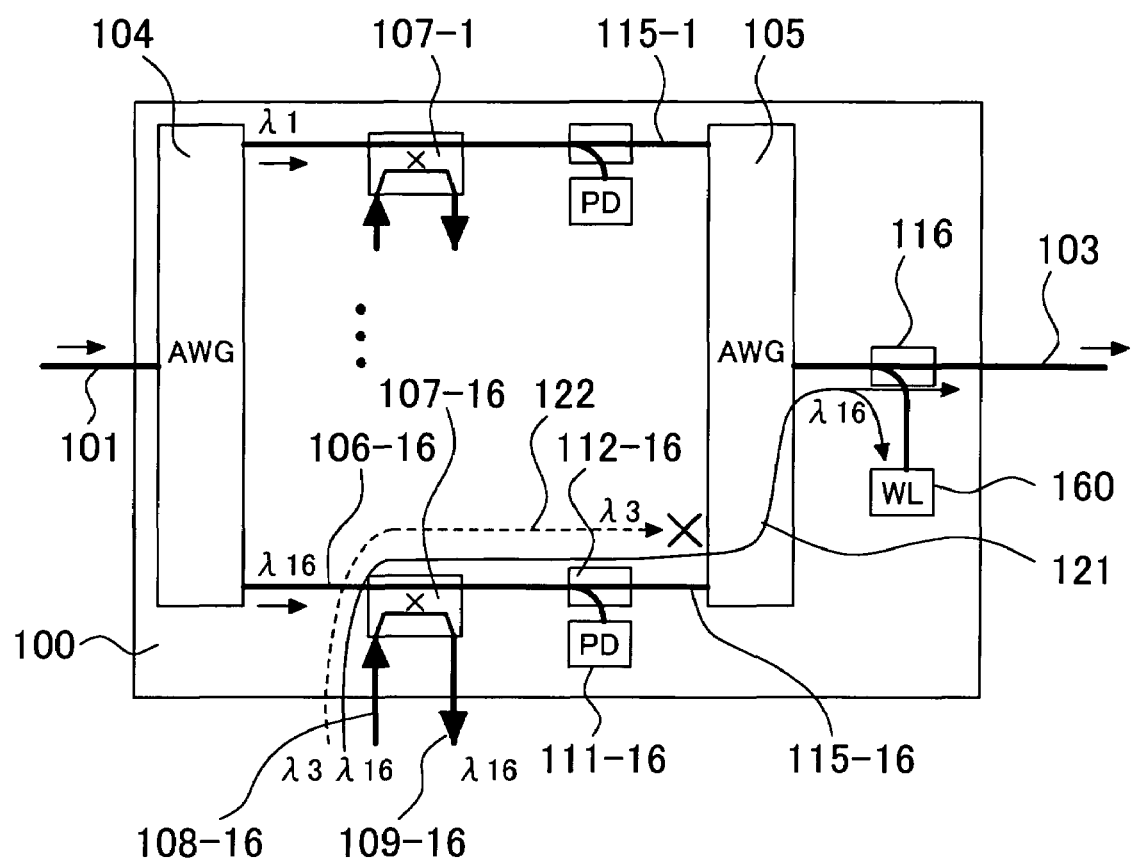
FIG. 8 is a configuration diagram illustrating a second embodiment of the present invention.

FIG. 8 is a configuration diagram illustrating a second embodiment of the present invention. This is an example in which part of a wavelength division multiplexed signal output to an output optical fiber 103 is branched by the optical coupler 116, and the branched wavelength division multiplexed signal is then inputted into the wavelength meter 160 where wavelengths of optical add signals are measured. For example, if the 2×2 optical switch 107-16 for switching an optical signal having the wavelength λ16 between the through state and the add state is in the add state, when an incorrect optical signal having the wavelength λ3 is inputted into the optical add signal input fiber 108-16, the optical signal is blocked by the optical wavelength multiplexer 105 as shown by the path 122. Accordingly, although the optical signal is detected by the forward direction optical detector 111-16, this optical signal does not arrive at the wavelength meter 160. On the other hand, when a correct optical signal having the wavelength λ16 is inputted into the optical add signal input fiber 108-16, the optical signal follows the path 121. As a result, an optical add signal is detected by the forward direction optical detector 111-16, and a wavelength is measured by the wavelength meter 160. Accordingly, from the above-mentioned result, it is possible to judge whether or not an optical add signal exists and whether or not a wavelength is correct. However, as is the case with the first embodiment, because not only an optical add signal but also an optical through signal is inputted into the wavelength meter 160, the measurement of the optical add signal wavelength, and the judgment as to whether or not the optical add signal wavelength is correct, require the use of the algorithm and of the judgment circuit that are similar to those in the first embodiment as shown in FIGS. 5, 6, 7. For example, if the 2×2 optical switch 107-16 is in the add state, and if the forward direction optical detector 111-16 has detected input light, and if the wavelength meter 160 has detected a wavelength component having the wavelength λ16, it can be judged that "an optical add signal having the wavelength λ16 has been detected". On the other hand, if the 2×2 optical switch 107-16 is in the add state, and if the forward direction optical detector 111-16 has detected input light, and if the wavelength meter 160 has not detected a wavelength component having the wavelength λ16, it can be judged that "a wavelength error of the optical add signal inputted into the optical add signal input fiber 108-16 has occurred".

The wavelength meter used in this embodiment is relatively expensive. However, it is possible to arbitrarily attach this wavelength meter to each equipment without changing the design of the equipment, and therefore this wavelength meter has the advantage of providing easy expansion of functions.

Third Embodiment

Figure 9:
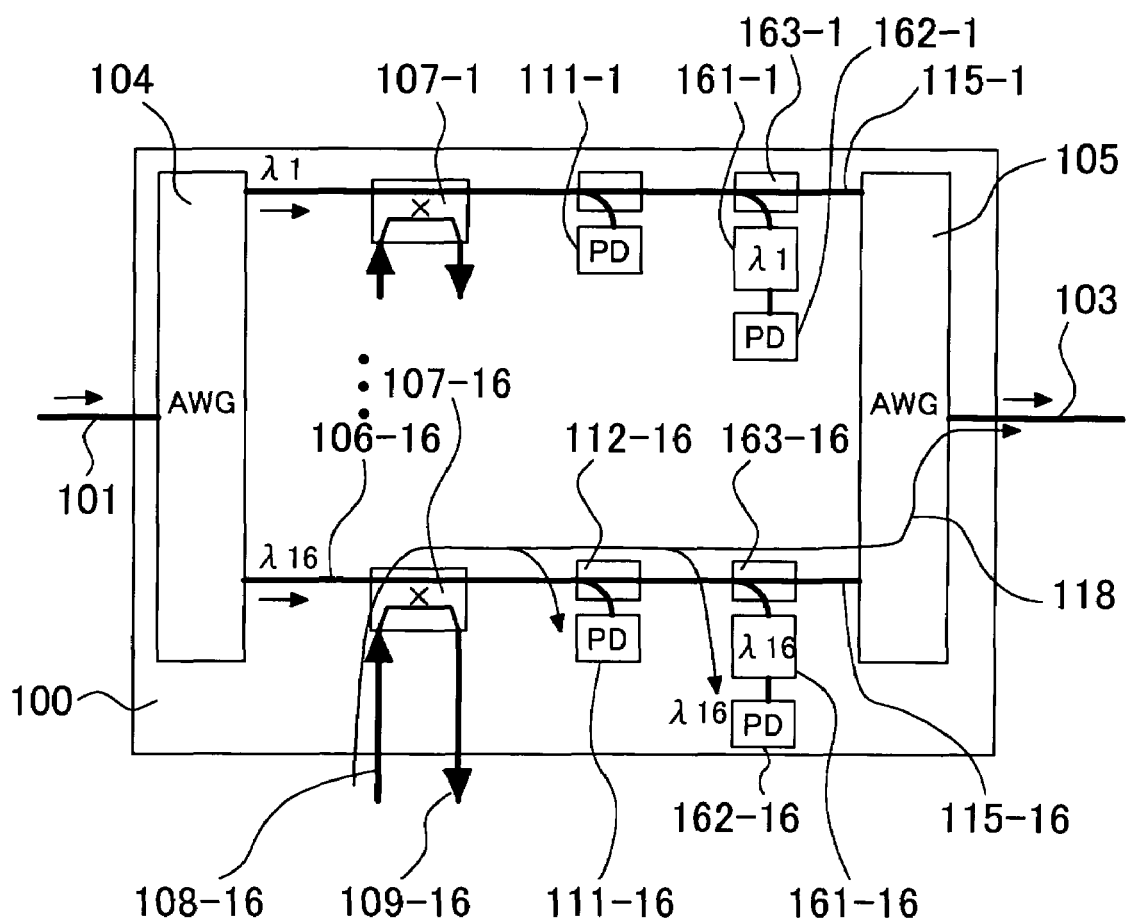
FIG. 9 is a configuration diagram illustrating a third embodiment of the present invention.

FIG. 9 is a configuration diagram illustrating a third embodiment of the present invention. This is an example in which the plurality of input optical fibers 115-1 through 115-16 of the optical wavelength multiplexer are further provided, respectively, with optical couplers 163-1 through 163-16, optical bandpass filters 161-1 through 161-16 that passes only optical signals having the wavelengths 1 through 16 respectively to block the other wavelengths, and optical detectors 162-1 through 162-16 so that the judgment can be made as to whether or not an optical add signal having a correct wavelength has been detected. For example, as indicated by the path 118, part of an optical add signal having the wavelength λ16 inputted into the optical add signal input fiber 108-16 is branched by the optical coupler 163-16. After that, the branched part of the optical add signal passes through the optical bandpass filter 161-16 that passes only an optical signal having the wavelength λ16, and then this passed signal is detected by the optical detector 162-16. Accordingly, in addition to the judgment as to whether or not the forward direction optical detector 111 has detected an optical add signal, it is possible to judge whether or not an optical add signal having a correct wavelength is inputted. It is to be noted that if it is not necessary to judgment whether or not an optical add signal has been detected, it is not always necessary to place the optical couplers 111-1 through 111-16 and the forward direction optical detectors 11'-1 through 111-16 as shown in this example.

Because the number of parts used in this embodiment is smaller than those used in the other embodiments, the advantage of increasing the reliability of the equipment as a whole can be expected.

Fourth Embodiment

Figure 10:
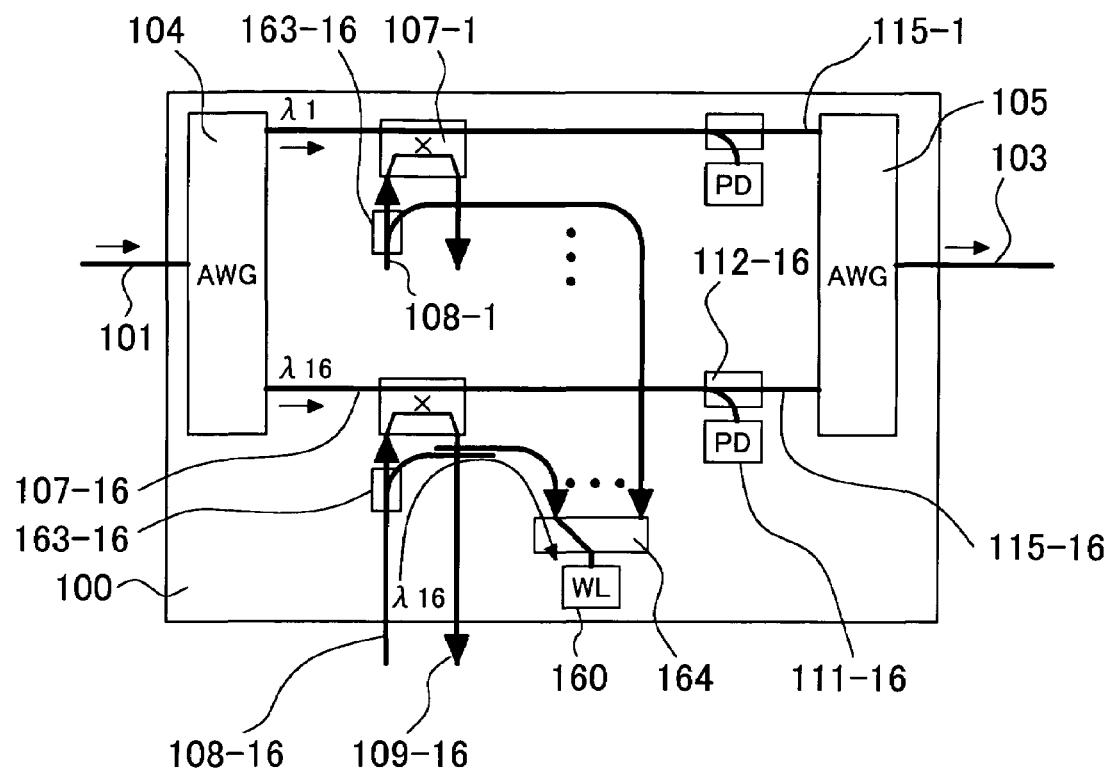
FIG. 10 is a configuration diagram illustrating a fourth embodiment of the present invention.

FIG. 10 is a configuration diagram illustrating a fourth embodiment of the present invention. In this example, the optical couplers 163-1 through 163-16 are place in the middle of the optical add signal input fibers 108-1 through 108-16 respectively so that part of an optical signal is branched. The branched optical signal is then inputted into the wavelength meter 160 through a 16×1 optical switch 164 to measure wavelength of optical add signals. To be more specific, it becomes possible to judge whether or not an optical signal having an appropriate wavelength is inputted into each optical add signal input fiber by switching the 16×1 optical switch 164 in order so that an optical signal from one of the optical add signal input fibers 108-1 through 108-16 is inputted into the wavelength meter 160, and then by measuring its wavelength. It is not always necessary to extract, from an optical add signal input port, the optical signal used for the judgment of the optical add signal wavelength as shown in this example. This optical signal may also be extracted from the input optical fibers 115 of the optical wavelength multiplexer. Moreover, the 16×1 optical switch 164 may also be replaced with an optical coupler having 16 inputs and one output, or the like.

Fifth Embodiment

Figure 11:
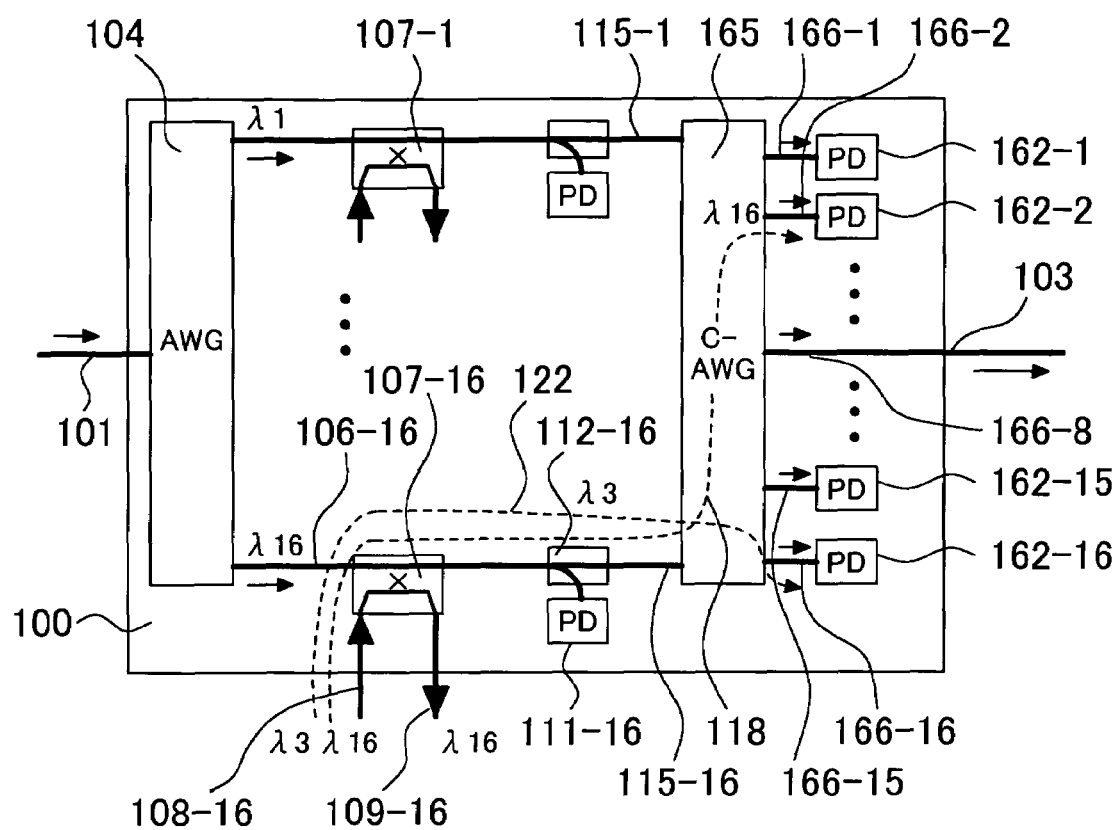
FIG. 11 is a configuration diagram illustrating a fifth embodiment of the present invention.

FIG. 11 is a configuration diagram illustrating a fifth embodiment of the present invention. In this configuration, a circulating-type arrayed waveguide optical wavelength multiplexer 165 handling 16 wavelengths is used as an optical wavelength multiplexer for multiplexing optical signals. Optical detectors 162 are placed at unused ports among output ports 166-1 through 166-16 of the circulating-type arrayed waveguide optical wavelength multiplexer 165 so as to detect an input wavelength error of an optical add signal. The circulating-type arrayed waveguide optical wavelength multiplexer is a kind of arrayed waveguide optical wavelength multiplexer that is widely used to multiplex/demultiplex wavelengths of a wavelength division multiplexing signal. The circulating-type arrayed waveguide optical wavelength multiplexer has input ports, the number of which is the same as that of output ports, and has the following characteristics: only when specific wavelengths λ1-16 are inputted into their corresponding input ports, outputting a wavelength division multiplexing signal to one specific output port (for example, the output port 166-8 in this figure); and if a wavelength of an optical signal inputted into each input port deviates from the correct wavelength, periodically outputting an optical signal to the other output ports 166-1 through 166-7 and 166-9 through 166-16 in response to the amount of deviation in wavelength. For example, if an optical signal having the wavelength λ3 is inputted into the optical add signal input fiber 108-16 that is improper, the optical signal is output to an unused port such as the output port 166-16 as indicated by a path 122. In this case, the optical detector 162-16 can detect this optical signal. Accordingly, optical detectors 162-1 through 162-7 and 162-9 through 162-16 are placed at the unused output ports 166-1 through 166-7 and 166-9 through 166-16 respectively. Judging whether or not an optical signal has been detected makes it possible to detect wavelength error S of optical add signal S.

In this embodiment, only the circulating-type arrayed waveguide optical wavelength multiplexer is required, and no other parts need to be added. Therefore, there is the advantage of making an equipment compact.

Sixth Embodiment

Figure 12:
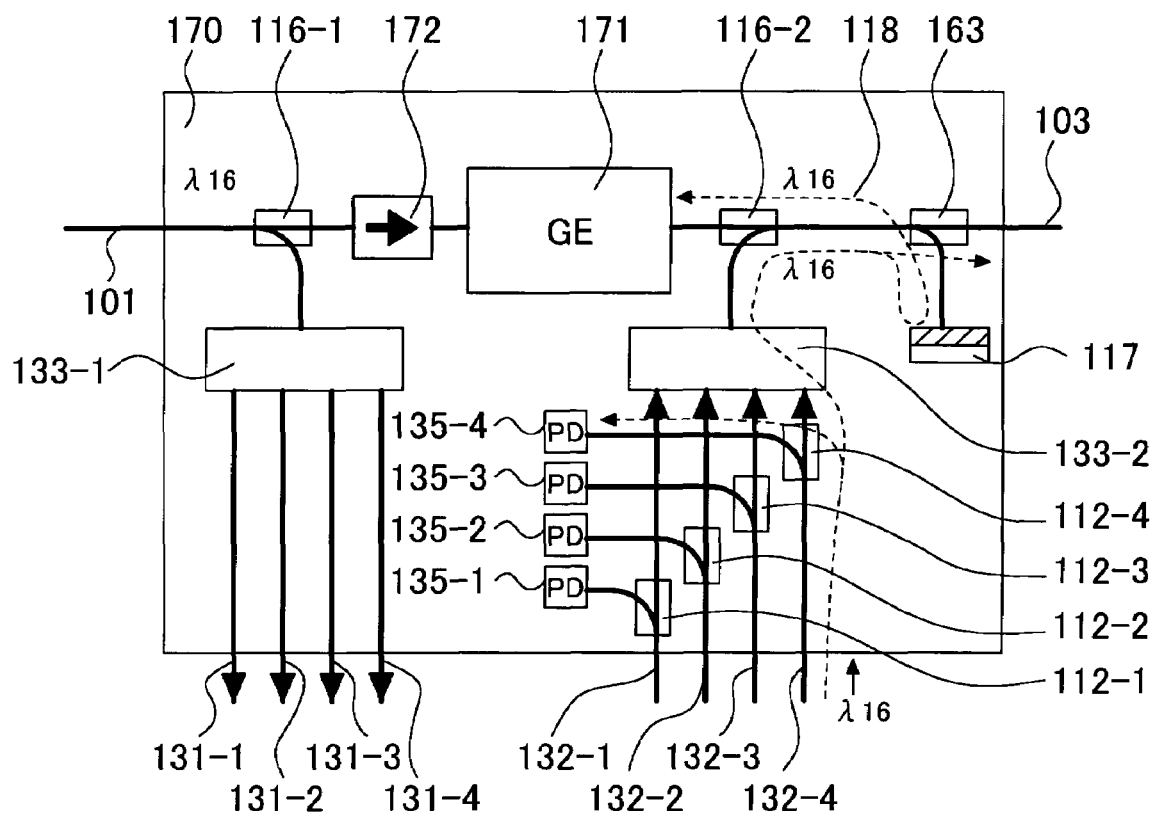
FIG. 12 is a configuration diagram illustrating a sixth embodiment of the present invention.

FIG. 12 is a configuration diagram illustrating a sixth embodiment of the present invention. This is an example in which the conventional broadcast and select type reconfigurable optical wavelength add-drop multiplexer shown in FIG. 3 is provided with a mechanism for judging wavelengths of optical add signals. In the broadcast and select type reconfigurable optical wavelength add-drop multiplexer 170 according to the present invention, part of an optical signal output to the output optical fiber 103 is branched by the optical coupler 163. The branched optical signal is then reflected by the mirror 117, and accordingly the reflected optical signal returns to a gain equalizer 171 of the present invention, where wavelengths of optical add signals are judged. For example, if an optical add signal having the wavelength $\lambda 16$ is inputted into the optical add signal input fiber 132-4, this optical signal travels along the path 118 as indicated with a dotted line. While a large part of the optical signal is output from the output optical fiber 103, part of the optical signal is branched by the optical coupler 163. The branched optical signal is reflected by the mirror 117, and the reflected optical signal is then inputted into the gain equalizer 171 in the reverse direction.

Figure 13:
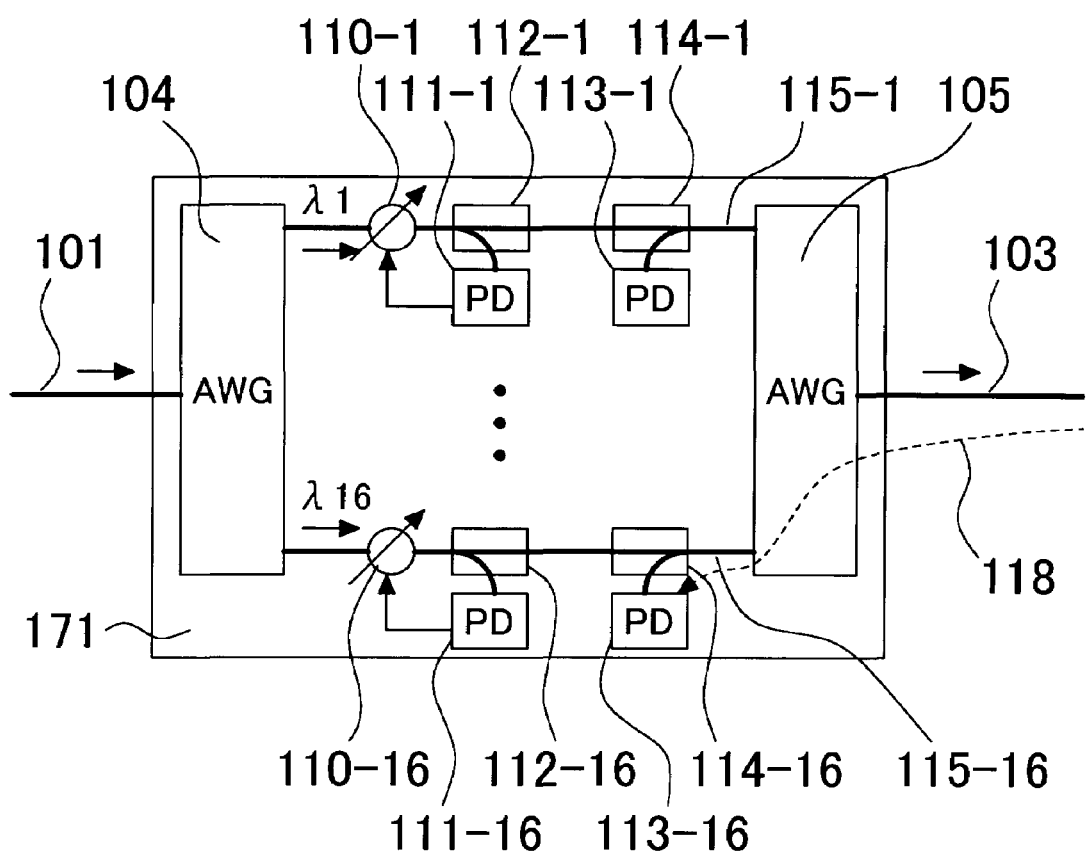
FIG. 13 is a configuration diagram illustrating an example of a gain equalizer 171 according to the sixth embodiment of the present invention.

FIG. 13 is a configuration example of a gain equalizer according to the present invention. In this gain equalizer, an optical signal is temporarily separated into different optical paths 115-1 through 115-16 corresponding to the specific wavelengths. Then, the separated optical signals are multiplexed by the optical wavelength multiplexer 105 in an output unit before the multiplexed optical signal is output. The optical couplers 114-1 through 114-16, each of which branches part of an optical signal traveling in the reverse direction, are placed in the middle of the paths 115-1 through 115-16 respectively. Backward optical signals having the specific wavelengths are inputted into the backward direction optical detectors 113-1 through 113-16 respectively. For example, if an optical add signal having the wavelength $\lambda 16$ exists as described above, the optical add signal travels in the reverse direction along the path 118 as indicated with a dotted line, and then passes through the optical fiber 115-16 corresponding to the wavelength $\lambda 16$, and is consequently detected by the backward direction optical detector 113-16. Incidentally, in this example, as is the case with the first embodiment, not only the optical add signal but also an optical through signal is reflected by the mirror 117. The optical through signal is then detected by the backward direction optical detector 113-16. Therefore, using the circuits and the algorithm as shown in FIGS. 5, 6, 7 enables the judgment as to whether or not a wavelength of an optical add signal is correct. Incidentally, the configuration in which an optical signal is returned to the upstream is not limited to the broadcast and select type. In such a configuration, if the optical isolator 172 is placed on the upstream side so that unnecessary backward signal light is eliminated, it is possible to prevent the signal quality from degrading due to the reflection of backward signal light.

Incidentally, although it is assumed that the number of optical add signals and the number of drop light input fibers are 4 in this embodiment, there is no limit at the time of implementation, and therefore the number of optical add signals and the number of drop light input fibers may be set at arbitrary values.

Seventh Embodiment

Figure 14:
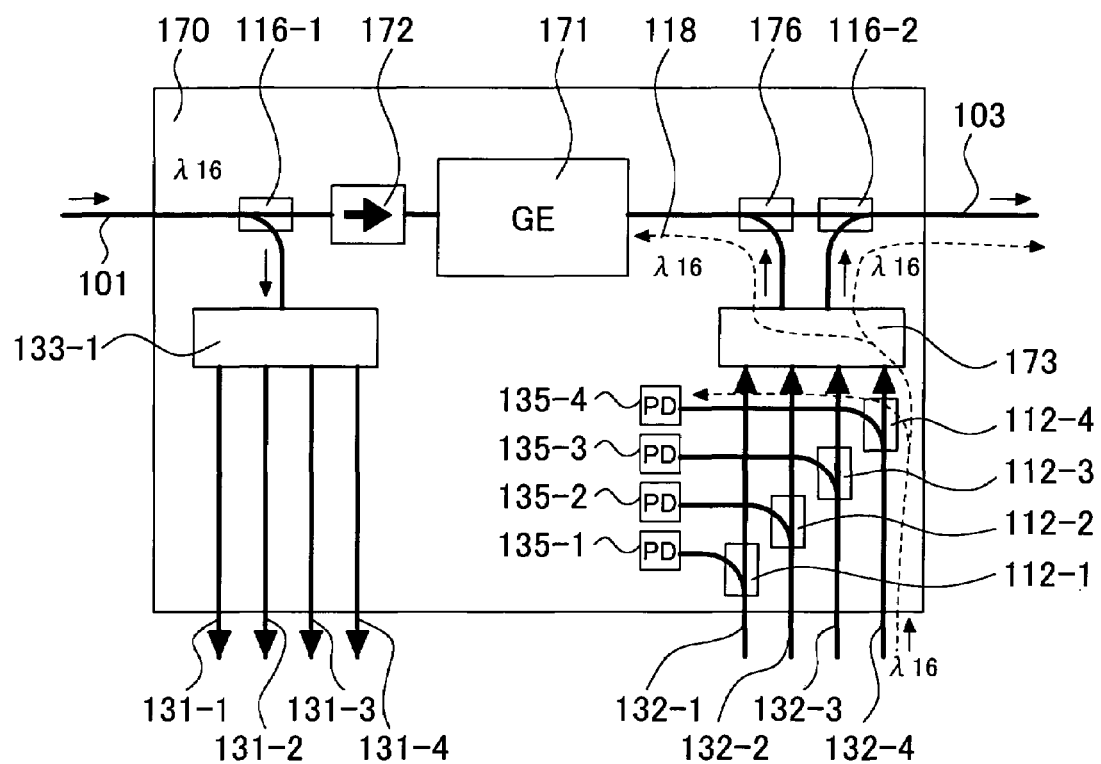
FIG. 14 is a configuration diagram illustrating a seventh embodiment of the present invention.

FIG. 14 is a configuration diagram illustrating a seventh embodiment of the present invention. Part of optical add signals travel in the reverse direction in the broadcast and select type reconfigurable optical wavelength add-drop multiplexer 170 according to the present invention, a configuration of which differs from that in the sixth embodiment. In this example, a multi-input 2-output optical coupler 173 is used to combine the optical add signal input fibers 132-1 through 132-4. One optical output is combined into an output optical signal through the optical coupler 116-2, and the other optical output is connected to the optical coupler 176 so as to pass it to the gain equalizer 171 in the reverse direction. In contrast to the sixth embodiment in which the optical through signals also travel in the reverse direction, only the optical add signals travel in the reverse direction in this example. Therefore, if the configuration shown in FIG. 13 is used as the gain equalizer 171, only optical add signals are inputted into the backward direction optical detectors 113-1 through 113-16. Accordingly, only the result of the detection by these optical detectors makes it possible to judge wavelengths of optical add signals. It is to be noted that although the multi-input 2-output optical coupler is used in this example, there arises no problem even if a coupler having two or more optical outputs, or even if two or more optical outputs are obtained by combining a plurality of optical couplers.

Eighth Embodiment

Figure 15:
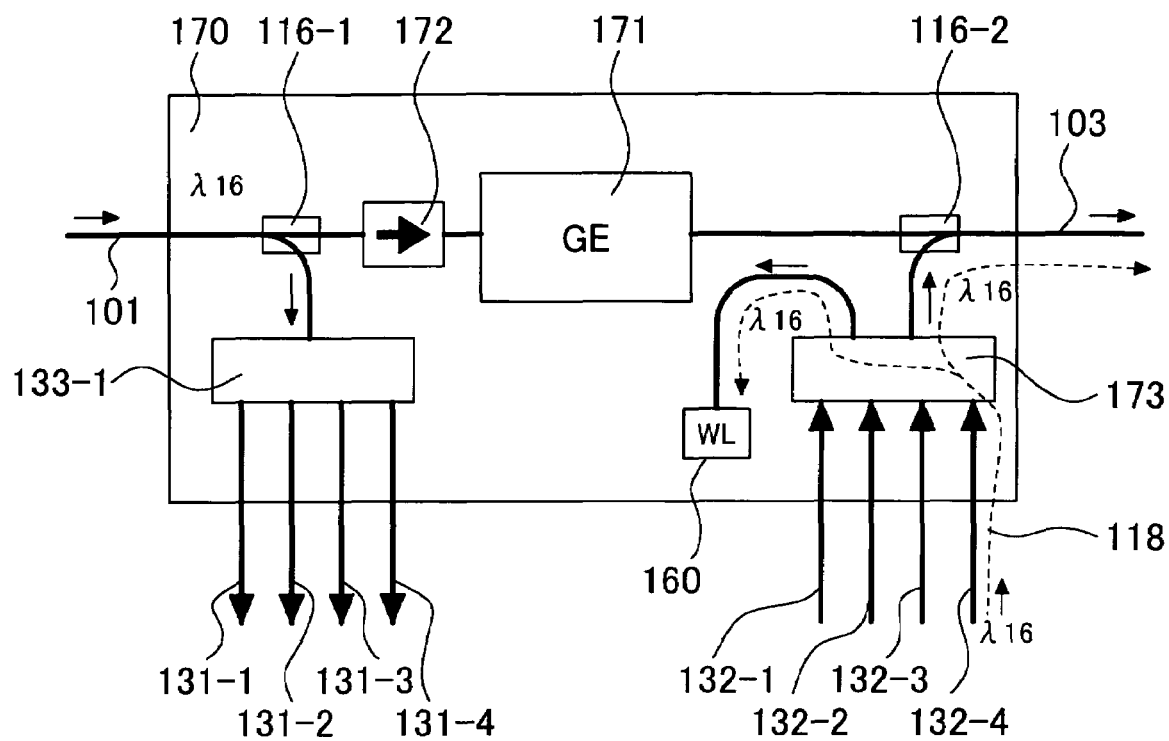
FIG. 15 is a configuration diagram illustrating an eighth embodiment of the present invention.

FIG. 15 is a configuration diagram illustrating an eighth embodiment of the present invention. This is an example in which the wavelength measurement of optical add signals are performed by the wavelength meter 160 in the broadcast and select type reconfigurable optical wavelength add-drop multiplexer 170 according to the present invention. In this example, the wavelength meter 160 is connected to one output of the multi-input 2-output optical coupler 173 so as to measure wavelengths of an optical add signals. A point to which the wavelength meter is connected is not limited to this position so long as wavelengths of optical add signals can be judged. Therefore, it may also be so devised that part of an optical signal is extracted, for example, in the middle of the output optical fiber 103 or in the middle of the optical add signal input fiber by use of an optical coupler to measure a wavelength. Incidentally, as is the case with the output optical fiber 103, if an optical signal is extracted from a point where there is a possibility that optical through signals will be mixed, it is necessary to separately make a judgment as to whether or not wavelengths of an optical through signals exist so that the wavelengths of the optical through signals are eliminated before judging wavelengths of optical add signals. This configuration can be achieved, for example, by separately extracting part of an optical signal before combining optical add signals, and then by measuring signal wavelengths.

Ninth Embodiment

Figure 16:
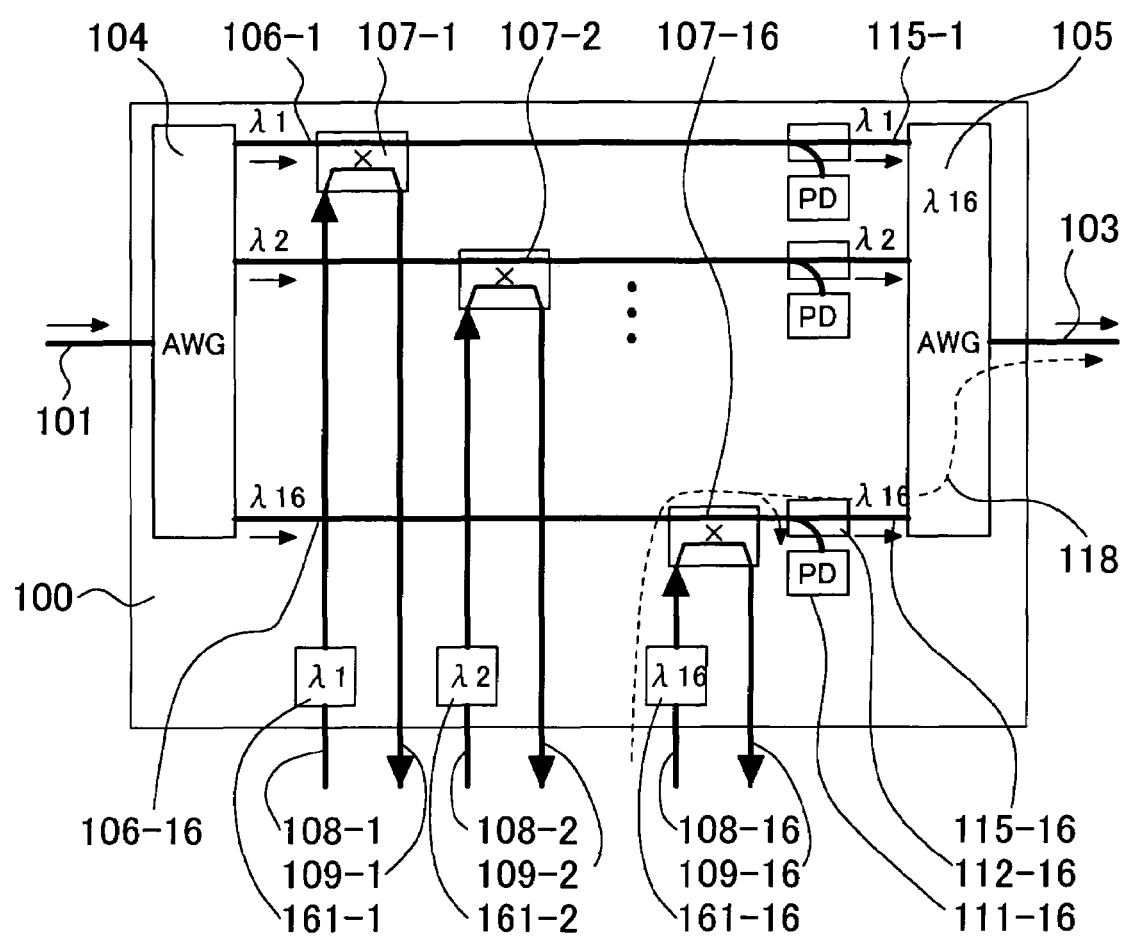
FIG. 16 is a configuration diagram illustrating a ninth embodiment of the present invention.

FIG. 16 is a configuration diagram illustrating a ninth embodiment of the present invention. This is an example in which the conventional reconfigurable optical wavelength add-drop multiplexer shown in FIG. 2 is provided with a function of judging by optical filters whether or not wavelengths of optical add signals are correct, and interlock mechanisms. In this example, optical bandpass filters 161-1 through 161-16, which pass only corresponding optical add signals having the correct wavelengths λ1 through λ16 respectively, are inserted in the middle of the optical add signal input fibers 108-1 through 108-16 respectively. As a result, even if an optical add signal having an incorrect wavelength (for example, λ3) is inputted into the optical add signal input fiber 108-16, this optical add signal is blocked by the optical bandpass filter 161-16, and accordingly does not arrive at the forward direction optical detector 111-16. Therefore, it is possible to detect a wavelength error of an optical add signal by displaying the existence of the optical add signal on the display panel in synchronization with the forward direction optical detector 111-16. Further, even inside the device, it becomes possible to prevent a counting error of the number of wavelengths from occurring due to an optical add signal having an incorrect wavelength.

Tenth Embodiment

Figure 17:
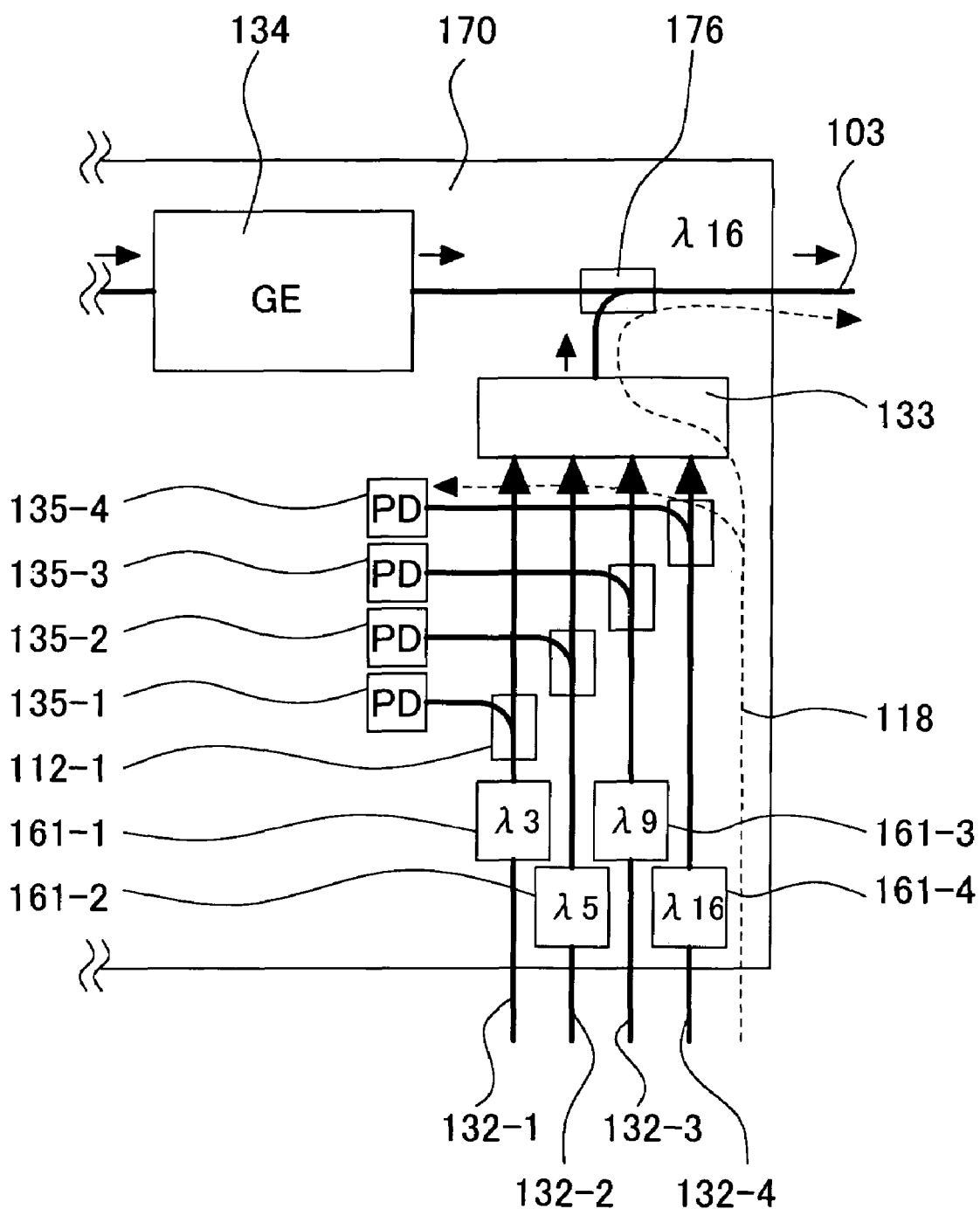
FIG. 17 is a configuration diagram illustrating a tenth embodiment of the present invention.

FIG. 17 is a diagram illustrating a tenth embodiment according to the present invention. In the broadcast and select type reconfigurable optical wavelength add-drop multiplexer 170 according to the present invention, a judgment is made as to whether or not wavelengths of optical add signals are correct, and there is provided interlock mechanisms which prevent incorrect optical add signals from being mixed. In this embodiment, an optical gain equalizer 134 which is conventionally configured is used. λ3, λ5, λ9, λ16 are assigned in advance as correct input wavelengths to four optical add signal input fibers 132-1, 132-2, 132-3, 132-4 respectively. Optical bandpass filters 161-1, 161-2, 161-3, 161-4, which pass only these optical signals, are placed in the middle of the optical add signal input fibers. Incidentally, in this configuration, what is lost is the advantage that there is no limit in wavelength of an optical signal inputted into an optical add signal input fiber, which is one of the advantages of the broadcast and select type. However, it becomes possible to prevent an inappropriate optical add signal from being inputted. However, when inputting an optical add signal having the same wavelength as that of an optical through signal being transmitted, it is not possible to prevent an optical through signal and an optical add signal from colliding.

Eleventh Embodiment

Figure 18:
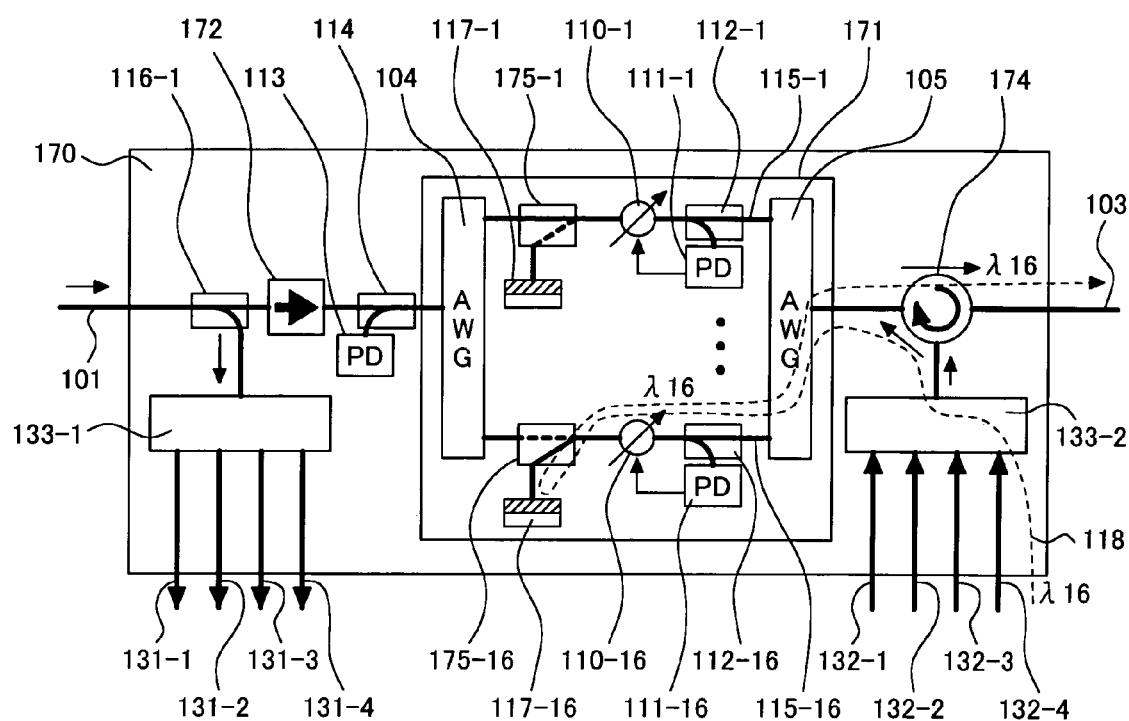
FIG. 18 is a configuration diagram illustrating an eleventh embodiment of the present invention.

FIG. 18 is a diagram illustrating an eleventh embodiment according to the present invention. In the broadcast and select type reconfigurable optical wavelength add-drop multiplexer 170 according to the present invention, there is provided interlock mechanisms for preventing optical add signals and optical through signals from colliding. In this example, optical add signals inputted into four optical add signal input fibers 132-1 through 132-4 are first combined by the optical coupler 133-2. Then, the combined optical add signal is passed through the output optical fiber 103 in the reverse direction by use of an optical circulator 174. As a result, the optical add signal is inputted into the gain equalizer 171 according to the present invention in the reverse direction. It is to be noted that the optical circulator 174 is used to reduce the loss of the optical add signal, and that if a loss is permitted to some extent, an optical coupler, or the like, may also be used.

Inside the gain equalizer 171 according to the present invention, an optical signal is separated into different paths 115-1 through 115-16 so that the level adjustment is performed on a wavelength basis. The optical wavelength multiplexer 105 placed in an output unit inputs an optical signal, which is inputted from the output side in the reverse direction, into the paths 115-1 through 115-16 that correspond to the wavelengths λ1 through λ16 respectively. The inputted optical signals then travel to the optical wavelength demultiplexer 104 in the reverse direction. 2×1 optical switches 175-1 through 175-16 are placed in the middle of the paths 115-1 through 115-16 respectively corresponding to the wavelengths. One input of each 2×1 optical switch is connected to the output of the optical wavelength demultiplexer 104, and the other input of each 2×1 optical switch is connected to each of the mirror 117-1 through 117-16. Thus, switching this switch makes it possible to select processing: passing through an optical through signal transmitted from the upstream; or reflecting an optical add signal, which is transmitted from the downstream, to output the optical add signal in the forward direction. As a result, the forward direction optical detector 111-16 can judge both the existence of an optical add signal and the existence of an optical through signal. In addition to it, the variable optical attenuator 110-16 controls the optical add signal and the optical through signal so that an appropriate signal level of each signal is kept. Then, the optical wavelength multiplexer 105 multiplexes both of the signals again with optical signals having the other wavelengths before the multiplexed signal is output to the output optical fiber 103.

FIG. 19 is a diagram illustrating operation of the 2×1 optical switch 175 according to the eleventh embodiment of the present invention. In a through state shown in FIG. 19(a), the optical switch mutually connects between an input port 180-1 and an output port 181, and accordingly an optical through signal 182 is output to the output port 181. In this case, an optical add signal 183 traveling in the reverse direction, which is inputted from the output port 181, passes through the 2×1 optical switch 175 just as it is, and is further transmitted to the upstream side over the input port 180-1. If the 2×1 optical switch 175 is switched to the add state shown in FIG. 19(b), the optical switch mutually connects between an input port 180-2 and the output port 181, and accordingly the optical through signal 182 is blocked by the 2×1 optical switch 175. On the other hand, the optical add signal 183 traveling in the reverse direction, which is inputted from the output port 181, temporarily travels from the 2×1 optical switch 175 to the input port 180-2, and is totally reflected by the mirror 117. The reflected optical add signal 183 then travels from the input port 180-2, and passes through the 2×1 optical switch 175 again, and is consequently output from the output port 181 in the forward direction. Thus, the combination of the optical switch 175 and the mirror 117 has a function of switching between an optical through signal traveling in the forward direction and an optical add signal traveling in the reverse direction so that a signal to be output in the forward direction is selected. It is to be noted that how to achieve this function is not always limited to this configuration. It is also possible to achieve the function by the combination of an optical attenuator and a loop back mechanism of an optical fiber, or the like.

In the reconfigurable optical wavelength add-drop multiplexer 170 shown in FIG. 18, the above-mentioned optical switch function makes it possible to prevent an optical add signal having an incorrect wavelength from colliding with an optical through signal while keeping the feature of the broadcast and select type reconfigurable optical wavelength add-drop multiplexer that a wavelength of an optical signal inputted into each optical add signal input fiber can be freely selected. To be more specific, for example, if the optical switch 175-1 is in the through state, even if the corresponding optical add signal having the wavelength λ1 is inputted, this optical add signal travels in the reverse direction just as it is through the optical switch 175-1, and further passes through the optical wavelength demultiplexer 104, and is consequently absorbed into the optical isolator 172 placed on the upstream side. Accordingly, no bad influence is exerted. In particularly, if the backward signal light which has passed through the gain equalizer 171 is branched by the optical coupler 114 so that the backward direction optical detector 113 can detect the branched backward signal light, it becomes possible to judge a wavelength error of an optical add signal from the result of the detection. However, only this configuration cannot identify a specific add signal input optical fiber, into which an optical add signal having an incorrect wavelength has been inputted, from among the add signal input optical fibers 132-1 through 132-4. In addition, if a plurality of optical add signals each having the same wavelength are inputted into two or more among the optical add signal input fibers 132-1 through 132-4, this cannot be detected.

Twelfth Embodiment

Figure 20:
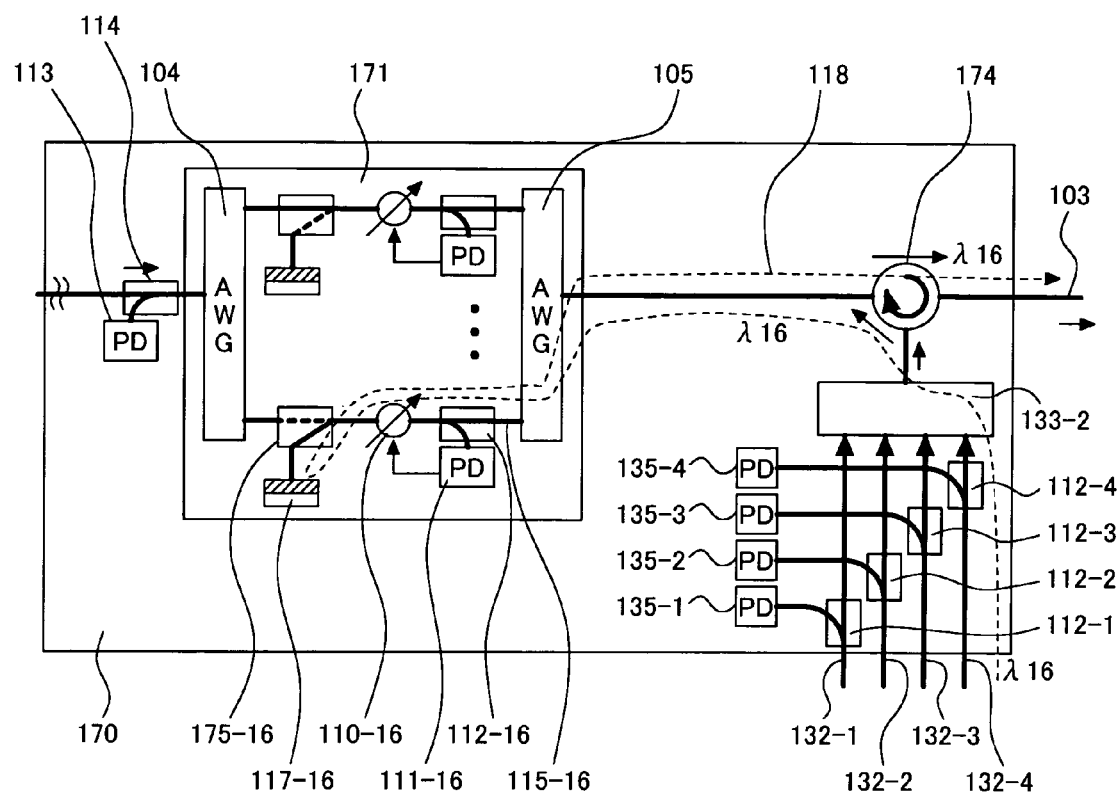
FIG. 20 is a configuration diagram illustrating a twelfth embodiment of the present invention.

FIG. 20 is a configuration diagram illustrating a twelfth embodiment of the present invention. This is an example in which there are added a function of detecting an input port into which an optical add signal having an incorrect wavelength has been inputted, and a function of detecting a collision of optical add signals each having the same wavelength, both of which were the problems in the eleventh embodiment. In this configuration, the optical couplers 112-1 through 112-4 and optical detectors 135-1 through 135-4 are placed in the middle of the optical add signal input fibers 132-1 through 132-4 respectively to detect whether or not an optical add signal has been inputted.

Figure 21:
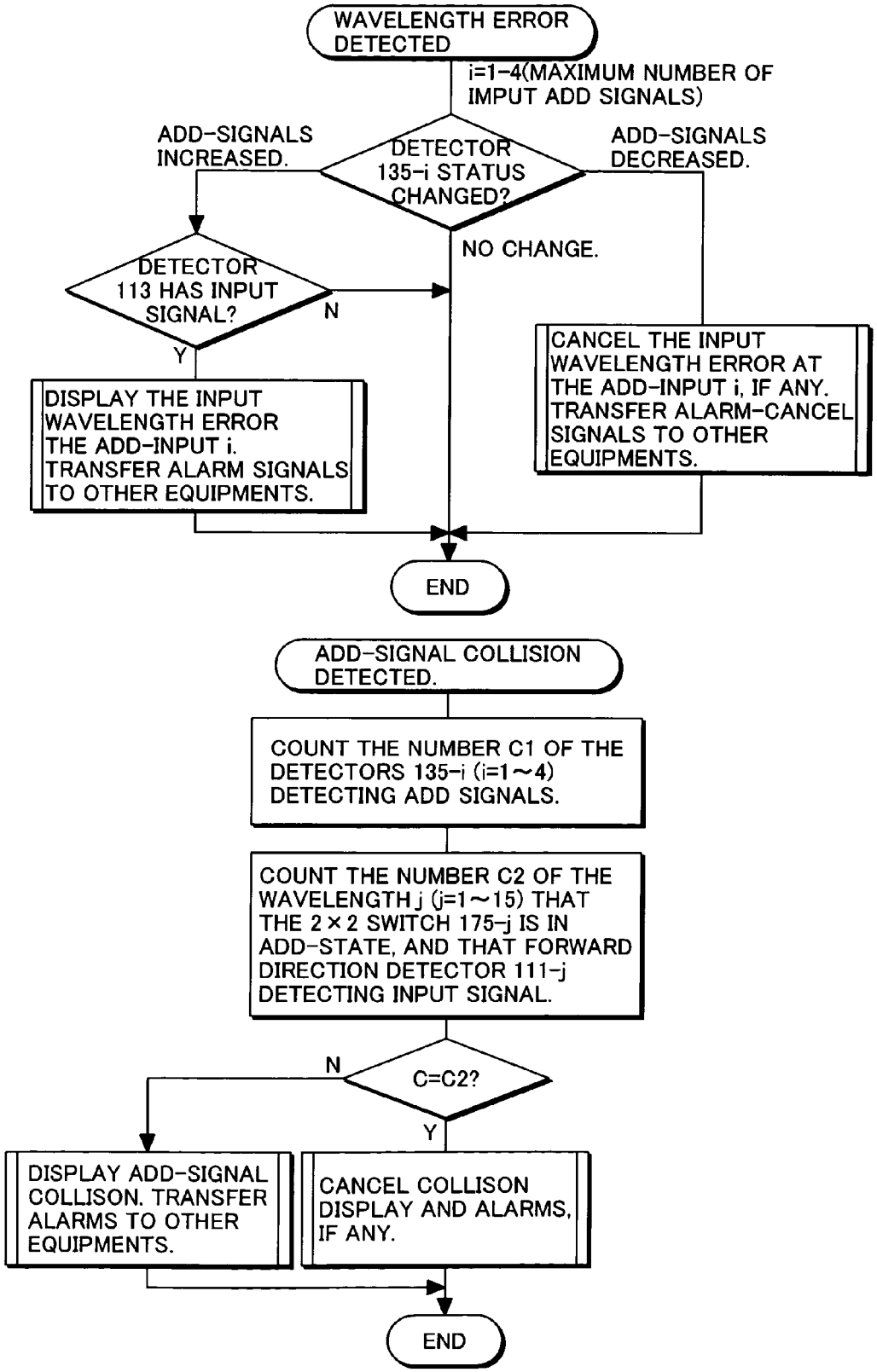
FIG. 21 is a diagram illustrating the detection algorithm for detecting a wavelength error and a collision between optical add signals according to the twelfth embodiment of the present invention.

FIG. 21 is a diagram illustrating the algorithm for detecting a wavelength error and a collision of optical add signals shown in FIG. 12. As for the detection of a wavelength error, every time an optical add signal is newly detected by the optical detectors 135-1 through 135-4, by using the backward direction optical detector 113 to check whether or not a wavelength error of an optical add signal has occurred, it becomes possible to identify a specific add signal input optical fiber, in which an input wavelength error has occurred, from among the add signal input optical fibers 132-1 through 132-4. In contrast with this, when an optical add signal has been lost in any one of the optical detectors 135-1 through 135-4, if there exists a wavelength error occurring in a corresponding one of the optical add signal input fibers 132-1 through 132-4, the wavelength error is cancelled.

On the other hand, a collision of optical add signals can be detected by comparing the number (C1) of optical add signals inputted into the optical add signal input fibers 132-1 through 132-4 with the number (C2) of optical add signals detected in the gain equalizer. If both of them do not agree with each other, it is judged that a collision of optical add signals has occurred. Therefore, the result is displayed or transferred as an alarm. If both of them agree with each other, the alarm is cancelled.

Thirteenth Embodiment

Figure 22:
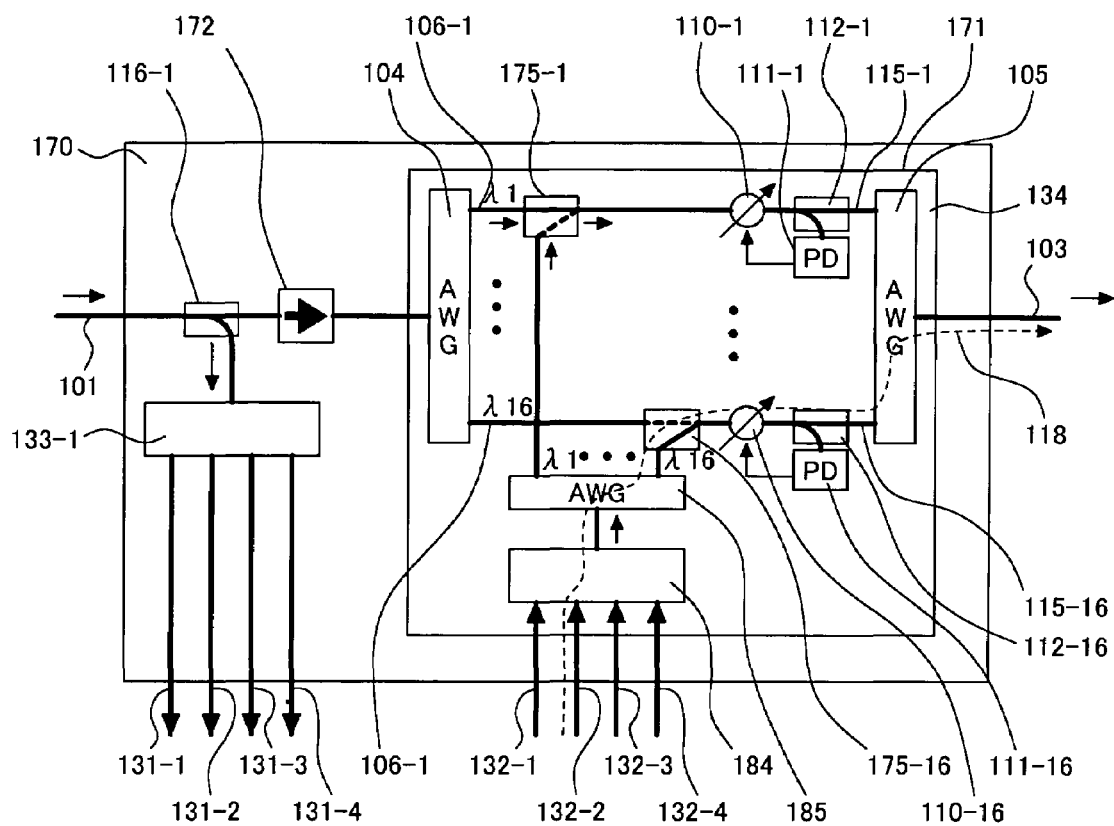
FIG. 22 is a configuration diagram illustrating a thirteenth embodiment of the present invention.

FIG. 22 is a configuration diagram illustrating a thirteenth embodiment of the present invention. Here, in the broadcast and select type reconfigurable optical wavelength add-drop multiplexer 170 according to the present invention, the same effects as those in the eleventh embodiment are produced without passing an optical signal in the reverse direction. In this configuration, optical add signals, which are inputted into the optical add signal input fibers 132-1 through 132-4, are first temporarily combined by an add signal combining optical coupler 184. Then, an add signal use optical wavelength demultiplexer 185 which comes next separates the combined optical add signals into different paths corresponding to the wavelengths λ1 through λ16. These paths are connected to input fibers of the 2×1 optical switches 175-1 through 175-16 having corresponding wavelengths. Each of the 2×1 optical switch 175-1 through 175-16 can be switched to select either outputting an optical through signal or outputting an optical add signal. For example, when an optical add signal having the wavelength λ16 is inputted into the optical add signal input fiber 132-2, this optical add signal passes through the add signal combining optical coupler 184 and the add signal use optical wavelength demultiplexer 185 along a path 118 indicated by a dotted line, and is then connected to one input of the optical switch 175-16. If the 2×2 optical switch 175-16 is in the add state, the optical add signal passes through the optical switch, and is then transmitted to the optical wavelength multiplexer 105 in the downstream, where the transmitted optical add signal is multiplexed with other optical through signals, and optical add signals, which have different wavelengths. The multiplexed signal is output from the output optical fiber 103. In the example shown in FIG. 18, because it is necessary to use reflected light traveling in the reverse direction, individual optical parts are required to meet low reflection specifications. Nevertheless, the specifications can be relaxed in this example, and accordingly the design is facilitated, which are the obtained advantages. Additionally, in contrast to FIG. 18, the part in which an optical signal passes through the same optical elements in both directions can be decreased, which makes it possible to reduce a loss. This is also the obtained advantage.

Incidentally, although the optical coupler 184 and the add signal use optical wavelength demultiplexer 185 are used to multiplex/demultiplex optical add signals in this example, a different configuration may also be adopted if the same effect can be produced, more specifically, if it possible to produce the effect of distributing a plurality of input optical signals into different output fibers on a wavelength basis. For example, this effect can also be achieved by a configuration in which an output fiber of a 4-input 16-output optical coupler is provided with an optical bandpass filter that passes any one of the wavelengths λ1 through λ16.

Incidentally, the reference numerals used in the diagrams of the application concerned will be listed as below.

100 Reconfigurable optical wavelength add-drop multiplexer (ROADM) according to the present invention
101 Input optical fiber
102 Optical amplifier
103 Output optical fiber
104 Optical wavelength demultiplexer
105 Optical wavelength multiplexer 106 Output fiber of an optical wavelength demultiplexer
107 2×2 optical switch
108 Optical add signal input fiber
109 Optical drop signal output fiber
110 Variable optical attenuator
111 Forward direction optical detector
112 Optical coupler
113 Backward direction optical detector
114 Optical coupler
115 Input optical fiber of an optical wavelength multiplexer
116 Optical coupler
117 Mirror
118 Path of an optical add signal having the wavelength λ16
119 Path of an optical add signal having the wavelength λ16 after reflection
120 Conventional reconfigurable optical wavelength add-drop multiplexer (ROADM)
121 Path of an optical add signal of a correct wavelength (λ16)
122 Path of an optical add signal of an incorrect wavelength (λ3)
123 Optical transmitter
124 Optical receiver
125 Wavelength-selective optical receiver
130 Conventional broadcast and select type reconfigurable optical wavelength add-drop multiplexer (ROADM)
131 Optical drop signal output fiber
132 Optical add signal input fiber
133 Optical coupler
134 Gain equalizer
135 Optical detector
136 Optical through signal having the wavelength λ2
137 Optical add signal having the wavelength λ2
140 LED display circuit
141 Voltage comparator
142 Reference voltage source
143 LED driving signal
144 Voltage comparator
145 Reference voltage source
146 LED driving signal
147 State signal of the 2×2 optical switch 107
148 Wavelength-error detection AND circuit
149 Invert circuit
150 Display panel of an optical wavelength add-drop multiplexer according to the present invention
151 Forward direction display LED
152 Backward direction display LED
153 Wavelength error display LED
154 Optical add signal detection AND circuit
155 Optical add signal detection signal
156 Optical add signal counter
160 Wavelength meter
161 Optical bandpass filter
162 Optical detector
163 Optical coupler
164 16×1 optical switch
165 Circulating-type arrayed waveguide optical wavelength multiplexer
166 Output port of the circulating-type arrayed waveguide optical wavelength multiplexer
170 Broadcast and select type reconfigurable optical wavelength add-drop multiplexer (OADM) according to the present invention
171 Gain equalizer according to the present invention
172 Optical isolator
173 Multi-input 2-output optical coupler
174 Optical circulator
175 2×1 optical switch
176 Optical coupler
180 Input port
181 Output port
182 Optical through signal
183 Optical add signal traveling in the reverse direction
184 Add signal combining optical coupler
185 Add signal use optical wavelength demultiplexer

What is claimed is:

1. An optical wavelength add-drop multiplexer placed in each node of an optical fiber transmission line transmitting a wavelength division multiplexed optical signal, said optical wavelength add-drop multiplexer comprising:

means for inserting (adding) one or more optical signals having desired wavelengths into the wavelength division multiplexed optical signal transmitted through the optical fiber transmission line, or branching (dropping) one or more optical signals having the desired wavelengths from the wavelength division multiplexed optical signal transmitted through the optical fiber transmission line to extract said wavelength division multiplexer optical signal having the desired wavelengths;

optical wavelength judgment means for judging whether or not one or more optical signals which are inserted into the optical wavelength add-drop multiplexer are one or more optical signals having the desired wavelengths by measuring wavelengths of the one or more inserted optical signals at each node, the optical wavelength judgment means judging that the wavelengths of the one or more inserted optical signals are correct when respective optical switches for the inserted optical signals are in an add-state and the desired wavelengths are detected; and display means for displaying one or more results of one or more judgments made by the optical wavelength judgment means, the display means being provided on a body of the optical wavelength add-drop multiplexer.

2. An optical wavelength add-drop multiplexer according to claim 1, wherein:

said display means displays at least one of items including: a measured value of a wavelength of the one or more inserted optical signals; the one or more results of the one or more judgment as to whether or not the wavelengths of the one or more inserted optical signals are the desired wavelengths; information that can be used to judge whether or not the wavelengths of the one or more inserted optical signals are correct; information about the number of optical signals, each of which has been judged to be an optical signal having one of the desired wavelengths among the inserted optical signals; and an alarm based on the one or more results of the one or more judgments made by the optical wavelength judgment means, or a remote operator is notified of at least one of the items.

3. An optical wavelength add-drop multiplexer placed in each node of an optical fiber transmission line transmitting a wavelength division multiplexed optical signal, said optical wavelength add-drop multiplexer comprising:

means for inserting (adding) one or more optical signals having desired wavelengths into the wavelength division multiplexed optical signal transmitted through the optical fiber transmission line, or branching (dropping) one or more optical signals having the desired wavelengths from the wavelength division multiplexed optical signal transmitted through the optical fiber transmission line to extract said wavelength division multiplexer optical signal having the desired wavelengths; and optical wavelength judgment means for judging whether or not one or more optical signals which are inserted into the optical wavelength add-drop multiplexer are one or more optical signals having the desired wavelengths by measuring wavelengths of the one or more inserted optical signals at each node, wherein:

if it is judged that a wavelength of one of the one or more inserted optical signals differs from one of the desired wavelengths, or if a wavelength of one of the one or more inserted optical signals agrees with a wavelength of an optical through signal or wavelengths of the other inserted optical signals, which pass through an optical switch that is used to extract from the optical wavelength add-drop multiplexer an optical signal having one of the desired wavelengths among optical signals demultiplexed by the optical wavelength demultiplexer for demultiplexing a wavelength division multiplexed optical signal having a plurality of different wavelengths into optical signal having different wavelengths, the wavelength division multiplexed optical signal inputted from the optical fiber transmission line, or that is used to insert an optical signal having one of the desired wavelengths into the optical wavelength add-drop multiplexer, then said optical add signal is blocked, or after checking that a wavelength of one of the one or more inserted optical signals is equivalent to one of the desired wavelengths, the one of one or more inserted optical signals is added to a wavelength division multiplexed optical signal having a plurality of different wavelengths, the wavelength division multiplexed optical signal being inputted from the optical fiber transmission line, or the inserted optical signal having the one of the desired wavelengths is multiplexed with the optical through signal.

4. An optical wavelength add-drop multiplexer placed in each node of an optical fiber transmission line transmitting a wavelength division multiplexed optical signal, said optical wavelength add-drop multiplexer comprising:

means for inserting (adding) one or more optical signals having desired wavelengths into the wavelength division multiplexed optical signal transmitted through the optical fiber transmission line, or branching (dropping) one or more optical signals having the desired wavelengths from the wavelength division multiplexed optical signal transmitted through the optical fiber transmission line to extract said wavelength division multiplexer optical signal having the desired wavelengths; and optical wavelength judgment means for judging whether or not one or more optical signals which are inserted into the optical wavelength add-drop multiplexer are one or more optical signals having the desired wavelengths by measuring wavelengths of the one or more inserted optical signals at each node, wherein:

a mirror is provided so that a part of an optical signal, which is output from the optical wavelength add-drop multiplexer to an optical fiber transmission line, is reflected back to travel in a reverse direction into the optical wavelength add-drop multiplexer from an output side of an optical wavelength demultiplexer for demultiplexing a wavelength division multiplexed optical signal having a plurality of different wavelengths, which has been inputted from the optical fiber transmission line, into optical signals having respective different wavelengths;

the optical signal which has traveled in the reverse direction is separated into different paths on a wavelength basis by an optical wavelength multiplexer that multiplexes each of the optical signals demultiplexed by the optical wavelength demultiplexer with each inserted optical signal; and existence of an optical signal having each wavelength is detected by a backward direction optical detector for detecting an optical signal traveling in the reverse direction, said backward direction optical detector being placed in each path.

5. An optical wavelength add-drop multiplexer placed in each node of an optical fiber transmission line transmitting a wavelength division multiplexed optical signal, said optical wavelength add-drop multiplexer comprising:

means for inserting (adding) one or more optical signals having desired wavelengths into the wavelength division multiplexed optical signal transmitted through the optical fiber transmission line, or branching (dropping) one or more optical signals having the desired wavelengths from the wavelength division multiplexed optical signal transmitted through the optical fiber transmission line to extract said wavelength division multiplexer optical signal having the desired wavelengths; and optical wavelength judgment means for judging whether or not one or more optical signals which are inserted into the optical wavelength add-drop multiplexer are one or more optical signals having the desired wavelengths by measuring wavelengths of the one or more inserted optical signals at each node, the optical wavelength judgment means judging that the wavelengths of the one or more inserted optical signals are correct when respective optical switches for the inserted optical signals are in an add-state and the desired wavelengths are detected, wherein:

an optical wavelength multiplexer having a circular type wavelength multiplexing property is used as an optical wavelength multiplexer for multiplexing each of optical signals which have been demultiplexed by an optical wavelength demultiplexer with each inserted optical signal, the optical wavelength demultiplexer demultiplexing a wavelength division multiplexed optical signal having a plurality of different wavelengths, which has been inputted from the optical fiber transmission line, into optical signals having respective different wavelengths, optical detectors are placed, respectively, at a plurality of unused output ports other than an output port that outputs the wavelength division multiplexed optical signal having a plurality of different wavelengths, which has been inputted from the optical fiber transmission line, and said optical detector detects existence of the one or more inserted optical signals having the desired wavelengths.

6. An optical wavelength add-drop multiplexer that is provided in each node of an optical fiber transmission line transmitting an wavelength division multiplexed optical signal, and that has a function of inserting (adding) a plurality of optical signals having desired wavelengths into the wavelength division multiplexed optical signal transmitted through the optical fiber transmission line, or a function of branching (dropping) an optical signal having the desired wavelengths from the optical fiber transmission line to extract said wavelength division multiplexed optical signal having the desired wavelengths, said optical wavelength add-drop multiplexer comprising:

means that has a broadcast type configuration in which an optical coupler combines one of the plurality of optical signals, which are inserted into the optical wavelength add-drop multiplexer, with an optical through signal passing through the optical wavelength add-drop multiplexer, before outputting the combined optical signals to an optical fiber transmission line, and that demultiplexes the optical through signal on a wavelength basis, and then transmits the demultiplexed signals into the optical wavelength add-drop multiplexer; and means for combining the plurality of inserted optical signals by use of an optical coupler, inputting the plurality of inserted optical signals combined from an optical wavelength multiplexer placed on an output side of the optical wavelength add-drop multiplexer, demultiplexing the inputted optical signals into different paths on a wavelength basis by the optical wavelength multiplexer, and then, for each wavelength path, selecting either totally reflecting one of the plurality of inserted optical signals traveling in a reverse direction to output the one of the plurality of inserted optical signals in a forward direction, or transmitting the optical through signal to output the optical through signal in the forward direction.

7. An optical wavelength add-drop multiplexer according to claim 6, further comprising:

optical wavelength judgment means for judging whether or not one or more optical signals which are inserted into the optical wavelength add-drop multiplexer are one or more optical signals having the desired wavelengths by measuring wavelengths of the one or more inserted optical signals at each node; and display means for displaying one or more results of one or more judgments made by the optical wavelength judgment means.

8. An optical wavelength add-drop multiplexer placed in each node of an optical fiber transmission line transmitting a wavelength division multiplexed optical signal, said optical wavelength add-drop multiplexer comprising:

means for inserting (adding) one or more optical signals having desired wavelengths into the wavelength division multiplexed optical signal transmitted through the optical fiber transmission line, or branching (dropping) one or more optical signals having the desired wavelengths from the wavelength division multiplexed optical signal transmitted through the optical fiber transmission line to extract said wavelength division multiplexer optical signal having the desired wavelengths; and optical wavelength judgment means for judging whether or not one or more optical signals which are inserted into the optical wavelength add-drop multiplexer are one or more optical signals having the desired wavelengths by measuring wavelengths of the one or more inserted optical signals at each node, wherein:

said optical wavelength add-drop multiplexer has a broadcast type configuration in which one of the inserted optical signals and an optical through signal are coupled by an optical coupler before outputting the coupled signals to an optical fiber transmission line, and has inside the optical wavelength add-drop multiplexer one or more paths for wavelength-demultiplexing the optical through signal into signals on a wavelength basis, and also has a configuration in which all of the inserted optical signals are temporarily combined by an optical coupler before demultiplexing the combined signals into different paths on a wavelength basis by an optical wavelength demultiplexer; and among the one or more paths of the demultiplexed optical through signals and the paths of the combined optical signals which were demultiplexed, one of paths having the same wavelength is selected and inputted into an optical wavelength multiplexer, and then the optical through signal is transmitted and outputted the optical through signal, or an optical add signal is selected and outputted.

* * * * *

UNITED STATES PATENT AND TRADEMARK OFFICE
CERTIFICATE OF CORRECTION

| | |
|---|---|
| PATENT NO. | : 7,653,311 B2 |
| APPLICATION NO. | : 10/913432 |
| DATED | : January 26, 2010 |
| INVENTOR(S) | : Kikuchi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1299 days.

Signed and Sealed this

Twenty-third Day of November, 2010

David J. Kappos
*Director of the United States Patent and Trademark Office*